United States Patent
Wilson et al.

(10) Patent No.: US 11,171,978 B2
(45) Date of Patent: Nov. 9, 2021

(54) DYNAMIC MONITORING, DETECTION OF EMERGING COMPUTER EVENTS

(71) Applicant: MICROSOFT TECHNOLOGY LICENSING, LLC, Redmond, WA (US)

(72) Inventors: Alexander James Wilson, Dublin (IE); Tom Neckermann, Dublin (IE); Simone Van Bruggen, Utrecht (NL)

(73) Assignee: Microsoft Technology Licensing, LLC., Redmond, WA (US)

( * ) Notice: Subject to any disclaimer, the term of this patent is extended or adjusted under 35 U.S.C. 154(b) by 375 days.

(21) Appl. No.: 16/367,152

(22) Filed: Mar. 27, 2019

(65) Prior Publication Data

US 2020/0314127 A1 Oct. 1, 2020

(51) Int. Cl.
*H04L 29/06* (2006.01)
*H04L 12/26* (2006.01)

(52) U.S. Cl.
CPC .......... *H04L 63/1425* (2013.01); *H04L 43/04* (2013.01); *H04L 43/062* (2013.01);
(Continued)

(58) Field of Classification Search
CPC ... H04L 63/1425; H04L 43/04; H04L 43/062; H04L 43/0817; H04L 43/16; H04L 63/1416; H04L 63/1441; H04L 63/20
See application file for complete search history.

(56) References Cited

U.S. PATENT DOCUMENTS

| 8,887,286 B2 | 11/2014 | Dupont et al. |
|---|---|---|
| 9,202,249 B1 | 12/2015 | Cohen et al. |

(Continued)

FOREIGN PATENT DOCUMENTS

| CA | 2997597 C | * | 1/2021 | ........... H04L 67/303 |
|---|---|---|---|---|
| CN | 102045358 A | | 5/2011 | |
| EP | 2924579 A1 | | 9/2015 | |

OTHER PUBLICATIONS

Landauer, et al., "Dynamic log File Analysis: An Unsupervised Cluster Evolution Approach for Anomaly Detection", In Journal of Computers & Security, vol. 79, Sep. 4, 2018, pp. 94-116.
(Continued)

*Primary Examiner* — Ali S Abyaneh
*Assistant Examiner* — Shu Chun Gao
(74) *Attorney, Agent, or Firm* — NovoTechIP International PLLC

(57) ABSTRACT

Technologies are provided for the monitoring, detection, and notification of emerging, related issues within a system, which may indicate a problem. Within a computing-security system, a sudden increase in the frequency of events associated with unauthorized logon attempts signal a real-time and ongoing security risk. A method monitors system-related events and generates a vector representation for each event based on event features. Clusters of related events are determined, and a state automaton is employed to determine a strength of temporal "bursty" activity for each cluster. Hypothesis testing is performed on each cluster to determine a likelihood that the cluster is a temporally emergent cluster. Clusters with a bursting likelihood above a threshold are determined to be an emergent cluster associated with an anomalous issue. A notification regarding the detected anomaly is provided. A remedial action addressing the anomaly is performed. Noisy clusters are filtered and aggregated based on their bursting likelihood and overlapping sub-spaces of the hyperspace.

20 Claims, 10 Drawing Sheets

(52) U.S. Cl.
CPC .......... *H04L 43/0817* (2013.01); *H04L 43/16* (2013.01); *H04L 63/1416* (2013.01); *H04L 63/1441* (2013.01); *H04L 63/20* (2013.01)

(56) References Cited

U.S. PATENT DOCUMENTS

| | | | |
|---|---|---|---|
| 9,589,299 | B2 | 3/2017 | Visbal et al. |
| 10,587,635 | B2 * | 3/2020 | Keller .................... B64D 45/00 |
| 2010/0082301 | A1 | 4/2010 | Skibiski et al. |
| 2013/0232045 | A1 | 9/2013 | Tai et al. |
| 2014/0006871 | A1 | 1/2014 | Lakshmanan et al. |
| 2014/0223555 | A1 | 8/2014 | Sanz hernando et al. |
| 2016/0036838 | A1 * | 2/2016 | Jain ..................... H04L 63/1416 726/23 |
| 2016/0065604 | A1 | 3/2016 | Chen et al. |
| 2017/0063911 | A1 | 3/2017 | Muddu et al. |
| 2018/0004942 | A1 | 1/2018 | Martin et al. |
| 2018/0285798 | A1 | 10/2018 | Kearns et al. |
| 2020/0053111 | A1 * | 2/2020 | Jakobsson ............... H04L 51/12 |

OTHER PUBLICATIONS

"International Search Report and Written Opinion Issued in PCT Application No. PCT/US2020/023469", dated May 26, 2020, 13 Pages.

Unankard, et al.,"Emerging Event Detection in Social Networks with Location Sensitivity", In Journal of World Wide Web, vol. 18, Issue 5, Jul. 15, 2014, pp. 1393-1417.

Wang, et al., "Learning, Indexing, and Diagnosing Network Faults", In Proceedings of the 15th ACM SIGKDD International Conference on Knowledge Discovery and Data Mining, Jun. 28, 2009, pp. 857-865.

Neill, et al., "Detection of Emerging Space-Time Clusters", In Proceedings of the eleventh ACM SIGKDD International conference on Knowledge discovery in data mining, Aug. 21, 2005, 10 Pages.

Neill, Daniel, "Expectation-based scan statistics for monitoring spatial time series data", In International Journal of Forecasting, vol. 25, Issue 3, Jul. 2009, pp. 498-517.

Sequeira, Karlton David., "ADMIT: Anomaly-based data mining for intrusions", In Master's Thesis, Jul. 23, 2002, 66 Pages.

* cited by examiner

DYNAMIC MONITORING, DETECTION OF EMERGING COMPUTER EVENTS

BACKGROUND

The monitoring and detection of anomalous events is a critical concern in securing the integrity, performance, and safety of computing or communication networking systems. Generally, events occurring within computing and networking systems may occur at various times. An unexpected increase (or decrease) in a frequency of related events may be indicative of a problem within computing and networking systems. For example, within a computing-security application, a sudden or significant increase in the frequency of events associated with unauthorized logon attempts may signal a real-time (and ongoing) security risk. Thus, an approximate real-time detection and identification of these emerging, related events is critical to the performance of such a computing-security applications.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The technologies described herein are directed towards enhanced methods and systems for the detection, identification, and/or notification of emerging, related events in a system. In some aspects, the detection, identification, and/or notification may occur in real-time or near real-time, and the system may comprise a computing or communication networking systems, or other systems described herein. In particular, many such systems, as well as the platforms and environments associated with these systems, will generate a stream of data regarding the system's operation. A particular event in the data stream may include, or be associated with, a timestamp that indicates a time and/or date associated with the event. Embodiments of the technologies described herein provide detection, identification, and/or notification of temporally emergent clusters within this time-series data or streams of time-varying data (i.e., data streams). As discussed throughout, clusters of related events, which may be temporally emergent (or "bursty") within time-series data, may provide a signal indicating one or more anomalous issues within a computing or networking/communication application, system, platform, or environment that generates, aggregates, monitors, and/or acquires the time-series data. In this way, some embodiments described herein may be utilized to provide an early warning of an emerging problem.

More specifically at a high level, various embodiments may monitor, in real-time (or near real-time), a stream of timestamped events. The events may be security-related events, for example. Some of these embodiments generate a vector representation for each event, which may be based on observable, latent, and/or hidden features of the events. These events may be embedded within a hyperspace spanned by the vector embeddings, such that a distance between any two events within the hyperspace indicates a degree of relatedness of the features of the two events. Clusters of related events are determined, via clustering methods. A finite-state or an infinite-state automaton is employed to determine a strength (or weight) of temporal "bursty" activity for each cluster. Some embodiments then may perform hypothesis testing on each cluster to determine a likelihood that the cluster is a temporally emergent (i.e., "bursting") cluster, as compared to the likelihood that the cluster is not a temporally emergent (i.e., "not bursting) cluster. Noisy clusters also may be filtered based on their bursting likelihood, and redundant clusters are aggregated based on overlapping sub-spaces within the hyperspace. After filtering and aggregating, clusters with a bursting likelihood above a likelihood threshold are determined to be an emergent cluster associated with an anomalous issue within the data stream. One or more notifications regarding the detected anomalous issue may be provided.

BRIEF DESCRIPTION OF THE DRAWINGS

Aspects of the disclosure are described in detail below with reference to the attached drawing figures, wherein.

DETAILED DESCRIPTION

Figure 1:
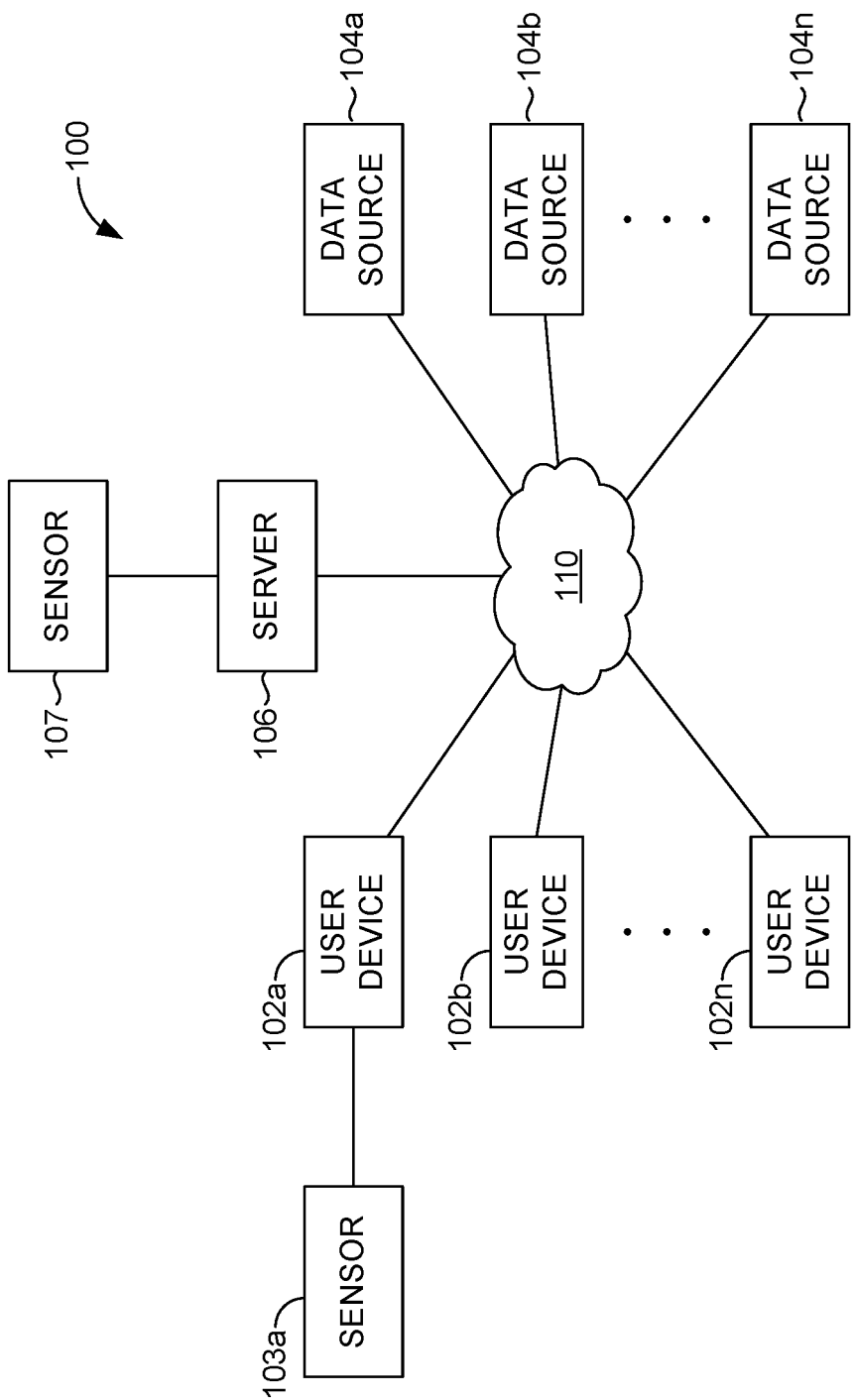
FIG. 1 is a block diagram of an exemplary computing environment suitable for use in implementing embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As used herein, the term "set" may be employed to refer to an ordered (i.e., sequential) or an unordered (i.e., non-sequential) collection of objects (or elements), such as but not limited to data elements (e.g., events, clusters of events, and the like). A set may include N elements, where N is any non-negative integer. That is, a set may include 0, 1, 2, 3, . . . N objects and/or elements, where N is an positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

As used herein, the term "event" may be employed to refer to a discrete unit of related data and/or information. The amount of information (as indicated by its Shannon or information entropy) included in an event is unbounded. As a consequence, the amount of digital storage space required to encode an event may be of any size (e.g., a bit, a byte, a kilobyte, a megabyte, and the like). A digital representation of an event may encode any and/or all information associated with the event. That is, an event may include an arbitrary and/or unbounded amount of encoded information and there is no upper bound to the size of an event. An event may include structured data, unstructured data, or a combination thereof. In many embodiments, each event includes, or is at least associated with, a timestamp. A timestamp includes data that encodes at least a time and date associated with the event. As used herein, the term "timestamp" may be any data encoded and/or associated with an event that enables a temporal ordering and/or temporal sequencing of a plurality of events. For example, a timestamp of an event may indicate the calendar year, the day of the year, and the time of the day that at least a portion of the data included in the event was generated, e.g., when the event occurred, when the event was observed, when the information and/or data of the event was initially encoded, when the information and/or data of the event was stored, or the like.

Some of the embodiments discussed herein refer to events associated with computing and/or communication network security applications. Such events may be referred to as "security-related events." For example, a discrete security-related event generated within a computing security application may include various computing and/or network security-related data. For instance, a security-related event may be generated in response to a successful or unsuccessful system logon attempt. Such security-related data encoded in an event that is associated with a successful or unsuccessful logon attempt may include, but is not limited to, user credentials, a geolocation of the attempt, a MAC address associated with the attempt, a timestamp associated with the attempt, and the like. However, these embodiments are non-limiting. An event need not be a computing and/or network security-related event. Other events may include data associated with virtually any system, platform, or environment that generates time-associated data. For example, an event may include data related to a criminal action, an accident involving one or more vehicles, an occurrence of an infectious disease, a detection of a cosmological event, a posting or other user activity on a social network platform, a sending/receiving of an electronic message, a request to view and/or listen to online content that is available via a streaming service, a request for a user-pickup on a rideshare platform, and the like.

In some non-limiting embodiments that include structured events, an event may include one or more field-label/value pairs. For instance, an event may include a field that is labeled with the field-label "user name," with a corresponding value of "User_X, as well as a field that is labeled with the field-label "geolocation," with a corresponding value of "(latitude_X, longitude_Y)." In some embodiments, the timestamp associated with an event may be similarly encoded in a field-label/value pair, e.g., a field label (e.g., "timestamp") and a corresponding value (e.g., "2019-01-01, 12:13:14".)

As used herein, the term "time-series data," may refer to any dataset (i.e., a set of discrete units of data) that includes a plurality of events, which may be temporally ordered based on a temporal value (e.g., a timestamp) associated with the events. The events may or may not be related events. In some embodiments, time-series data may include at least a portion of the events generated within a particular application, system, platform, and/or environment. In some embodiments, related events included in time-series data may be clustered within the time-series data. In some embodiments, time-series data may include a non-empty and ordered (i.e., sequential) set of events. The events within time-series data may be temporally ordered based on an associated temporal value, e.g., their associated timestamps. That is, time-series data may include a non-empty set of temporally-ordered events. For instance, an earliest occurring event included in the time-series data may be the first event in the ordered set and a most-current event may be the last event in the ordered set. In some embodiments, such as but not limited to real-time environments, time-series data may be referred to as the data stream (or streaming data) of the environment, because events are being generated and/or received, in order of their generation, within a stream of data generated via the environment.

Aspects of the technologies described herein are directed towards enhanced methods and systems for the detection, identification, and/or notification of emerging, related events in a system. The detection, identification, and/or notification may occur in real-time or near real-time, in some aspects. The system may comprise a computing or communication networking systems; one or more machines, such as robots, drones, a factory or manufacturing system, airplane or vehicle; or a mechanical device, especially one subject to wear or that requires maintenance, such as a wheel, engine, compressor, pump, generator; or similar systems. Many such systems, as well as the platforms and environments associated with these systems, will generate a stream of data regarding the system's operation. For example, a large machine or system may include sensors or monitoring services that are configured to detect or report certain aspects of system activity. A particular event in the data stream may include, or be associated with, a timestamp that indicates a time and/or date associated with the event. For example, the time-series data may be generated from a security-monitoring application on a computing network or sensor data in a machine. Accordingly, embodiments of the technologies described herein may provide detection, identification, and/or notification of temporally emergent clusters within this time-series data or streams of time-varying data (i.e., data streams).

As discussed throughout, clusters of related events, which are temporally emergent (or "bursty") within time-series data, may provide a signal indicating one or more anomalous issues within a computing or networking/communication application, system, platform, or environment that generates, aggregates, monitors, and/or acquires the time-series data. As also discussed throughout, a temporally emergent or bursting cluster may be a cluster that is currently experiencing an unexpected and/or sudden increase in the temporal frequency of related events. Accordingly, securing the performance, integrity, safety, and security of computing and communication/networking applications, systems, platforms, and environments may require the real-time detection, identification, and notification of clusters of related events, which emerge and/or burst within time-series data generated by the various systems and environments.

In a non-limiting example, the enhanced systems and methods may be deployed to monitor events associated with computing and/or communication networking applications. The detection and/or identification of an emergent (or bursty) cluster may be an indication of and/or signal associated with nefarious-user activity, or the emergence of a security-related, issue. In some non-limiting embodiments, a real-time notification may be provided to indicate one or more anomalous conditions associated with the detected emergent cluster. In some embodiments, the events within the emergent cluster (or the nefarious-user activity, functions, and/or operations associated with the events within the cluster) may be quarantined, isolated, or even terminated.

However, these computing and networking security-oriented embodiments are non-limiting, and it is understood that the enhanced systems and methods may be deployed to the real-time detection and notification of emergent clusters within time-series data or a time-varying data stream associated with virtually any types of event and/or applications. An emergent cluster of related events may serve as a signal, or other indicator, of an anomalous issue or emerging pattern in virtually any data stream associated with virtually any category of information. For example, the embodiments may be deployed to detect the emergence of an increase in crime-related activity associated with a geographic area, the emergence of bug-related issues after the deployment of a software application update, an increase in the up-regulation or down-regulation of gene-expression activity within a genomic dataset, an increase in cosmological activity within a cosmology dataset, an emerging outbreak of an infectious disease, a sudden increase in related user-activity within a social network (e.g., the emergence of a trending topic or subject), the emergence of an increased demand for ride-shares in specific neighborhood, and the like.

Conventional methods for approximate real-time detection of emerging clusters of related events often employ a "scanning time-window comparison" technology. This technology typically utilizes scanning time-window, of a pre-defined width, across time-series data and identifying regions within the time-series that include an increased frequency of events. In particular, a statistical temporal distribution of events is generated via historical time-series data. Such a temporal distribution characterizes a "historically-expected frequency" of events. These conventional technologies compare the expected frequency, which is based on the historical data, to the frequency of events occurring within a time-window (of pre-defined width) that is scanned across portions of the time-series data stream. That is, conventional technologies attempt to detect anomalous (and emerging) issues by monitoring statistically-significant differences between a temporal distribution of historical events and a temporal distribution of a subpopulation of the events (e.g., the events occurring during the previous 24 hours). For instance, a conventional detector may compare the frequency of related events occurring within the last 24 hours to the historical frequency of such events.

But the performance of these conventional technologies is limited, and suffers under various conditions within the time-series data. For example, the performance is sensitive to the pre-defined width of the time-window. In particular, the width of the window may not be commensurate with a period of emergence for each emerging cluster. To successfully detect an emerging cluster, the width of the window must be comparable to the temporal period associated with the emergence of the cluster. A time-window of 24 hours may fail to detect clusters emerging over a period of a week or a month, as well as clusters that emerge within a few minutes or seconds. Time-series data generated by various computing and network systems may include statistical noise, fluctuations, and variances in the historical data, as well as in the data occurring within the current window-of-interest. These conventional methods may falsely detect an apparent emergence of a cluster of related events, when the apparent emergence is due to noise or other statistical artifacts within the data stream.

Additionally, when multiple, discrete, and relatively quickly-emerging clusters occur within a single time-window, such conventional technologies may detect only a single cluster emerging within the time-window. Similarly, when a single, relatively slowly-emerging cluster spans multiple time-windows, the conventional technologies may detect multiple discrete emerging clusters. For instance, when a cluster emerges over two or more days, rather than detecting a single emerging cluster, conventional technologies employing a 24-hour scanning time-window may detect two or more separate emerging clusters. Thus, in addition to be being prone to both type I errors (i.e., "false positives") and type II errors (i.e., "false negatives"), these conventional technologies may fail to discriminate between separate and discrete emerging clusters, as well as erroneously detect multiple emerging clusters, when only a single cluster is emerging.

Furthermore, such conventional technologies rely on statistically-significant historical data of related events, which may not be available in various environments. For example, new event types and/or classes may occur due to the emergence of an anomalous issue. The historical data stream may include relatively few (or none) of the events associated with the emerging anomalous issues. Thus, due to the paucity of relevant historical data, these conventional methods will fail to detect the emergence of clusters of new or infrequently-occurring event types.

In contrast and as discussed throughout, the enhanced embodiments described herein overcome these and other limitations associated with conventional technologies, at least in part because the embodiments described herein do not rely upon a scanning time-window of a predefined width. Rather, in one aspect, these enhanced technologies model the temporal dynamics of clusters as frequency-dependent states, i.e., the dynamics of the clusters are modeled as a state machine with a finite or infinite number of states, each state being characterized by an expected frequency of occurrence of events. Rather than scanning a time-window across time-series data, the embodiments described herein employ a finite- or infinite-state automaton (e.g., Kleniberg's burst detection algorithm) to detect likely state transitions of the clusters, which are indicative of "bursty" or emergent clusters. Thus, because these embodiments model the clusters to include frequency-dependent states rather than employing a scanning window, the embodiments do not suffer the various performance limitations of conventional detection technologies. Accordingly, the embodiments described herein provide clear, significant, and measurable improvements and/or enhancements to the performance, integrity, safety, and security of computing and communication/networking applications, systems, platforms, and environments.

More particularly, the various embodiments can monitor, in real-time (or approximate real-time), a stream of time-stamped events. The embodiments generate a vector representation for each event based on observable, latent, and/or hidden features, aspects, or attributes of the events. The events are embedded within a hyperspace spanned by the vector embeddings. A distance between any two events within the hyperspace indicates a degree of relatedness of the features of the two events. Clusters of related events are identified, via clustering methods. A finite-state or an infinite-state automaton is employed to determine a strength (or weight) of temporal "bursty" activity for each cluster. Hypothesis testing is then performed on each cluster to determine a likelihood that the cluster is a temporally emergent (i.e., "bursting") cluster, as compared to the likelihood that the cluster is not a temporally emergent (i.e., "not bursting) cluster. Noisy clusters are filtered based on their bursting likelihood, and redundant clusters are aggregated based on overlapping sub-spaces within the hyperspace. After filtering and aggregating, clusters with a bursting likelihood above a likelihood threshold are considered to be an emergent cluster associated with an anomalous issue within the data stream. One or more notifications regarding the detected anomalous issue may be provided.

As noted above, the received events are embedded within a hyperspace, via vector representations that span the hyperspace. The hyperspace and the vector embeddings are based on observable, latent, and/or hidden features, aspects, or attributes of the events. More particularly, the dimensions of the hyperspace correspond to and/or correlate with the features, aspects, or attributes of the data encoded in the events. In various embodiments, the features may be orthogonal features of the events. Various forms of supervised and/or unsupervised deep machine learning (ML) methods may be employed to determine (or learn) the observable, latent, and/or hidden features, aspects, or attributes of the events.

In various embodiments, feature selection and/or feature pruning may be performed. That is, the dimensionality of the hyperspace may be reduced by pruning the deep-learned feature list. The feature list may be pruned to include a subset of features that includes only the most salient, discriminatory, and/or orthogonal/independent features of the learned features. For example, two highly correlated features may be aggregated such that the hyperspace includes only a single dimension corresponding to the two highly correlated features, rather than separate dimensions for the two features. Features with low spatial dispersion and/or low variability may be pruned to reduce the dimensionality of the hyperspace. Various methods may be employed to reduce the dimensionality of the hyperspace and increase the computational tractability of the various embodiments. Accordingly, the various embodiment provide additional enhancements (e.g., decreasing the computational time and/or memory requirements associated with highly-dimensional computational tasks) to the performance of computing and communication environments. The reduced-dimensionality hyperspace and vector embeddings may include dimensions corresponding to the pruned list of features. The features may be learned and/or pruned in an offline mode.

Once the features are determined and pruned, the trained ML model may be employed, at runtime, to generate the vector representations of the received events. For instance, a deep ML model (e.g., a ML model implemented on a deep neural network) may trained offline, via training data that includes labeled or annotated representative events, e.g., historical events. The representative events may be labeled or annotated to indicate a "ground truth" associated with the events. Via training the ML model, the features are "learned" and a hyperspace including one or more dimensions corresponding to each of the learned features may be generated. As events are generated and/or received during runtime, the events may be embedded within the hyperspace, via employing the trained ML model to generate vector representations for the events. In at least some embodiments, the ML model may be a compressed ML model, to provide additional enhancements to the computational efficiency of generating the vector embeddings.

Events with similar observable, latent, and/or hidden features, aspects, or attributes are considered related events. Thus, the vector embeddings of related events are similarly positioned or located within the hyperspace. A cluster of related events are events with vector embeddings spanning a particular sub-space (e.g., a hypersphere) of the hyperspace. That is, a cluster of related events is associated with a corresponding sub-space (including a location, shape, and/or volume within the hyperspace). A sub-space of the hyperspace is a finite and bounded volume and/or region within the hyperspace. The volume of the sub-space may be symmetric in one or more dimensions of the hyperspace. For example, a sub-space may include a hypersphere. In other embodiments, a sub-space may include a hyperelipitical, hyperellipoid, hyperconic, and/or hypercubic volume. In various embodiments, the term sub-space may refer to a finite and bounded volume within the hyperspace that bounds a plurality of the vector embeddings of related events. In at least one embodiment, the dimensionality of the sub-space may be reduced and/or pruned from the dimensionality of the hyperspace based on the dispersion of events included in the sub-space along the various dimensions. For example, if events that occur within the sub-space have a low dispersion along a particular dimension of the hyperspace, then that particular dimension may be pruned, regarding the events occurring within the cluster. The terms "cluster," or "cluster of related events" may be used to refer to a sub-space that includes a plurality of points corresponding to the vector embeddings of events. Thus, as used throughout, the terms sub-space and cluster may be used synonymously to refer to a finite and bounded volume with the hyperspace that includes a plurality of vector embeddings of events.

Various unsupervised or supervised methods may be employed to identify clusters of related events (i.e., identify a sub-space), via the vector embeddings of the events. The vector embeddings of the related events generally span the identified sub-space that is associated with the cluster. A degree of relatedness of events is based on a closeness or distance metric for the events within the hyperspace. Thus, a cluster may include (or be associated with a sub-space that includes) a plurality of events with one or more features that are highly correlated, or otherwise have relatively low dispersion/variance in one or more dimensions of the hyperspace. For instance, the events within a cluster may be significantly localized along one or more dimensions of the hyperspace.

As discussed below, the degree of relatedness between two events may refer to a correlation, localization, and/or dispersion of features other than temporal features. For example, the timestamps of events within some clusters (e.g., non-bursting or non-emergent clusters) may have relatively low correlation, have significant dispersion/variance, and/or are not highly localized within one or more temporal periods. However, for some clusters (e.g., emergent and/or bursting clusters), the timestamps of included events are highly correlated, have temporal dispersion/variance, and/or are highly localized within one or more temporal periods.

In some embodiments, various features, aspects, or attributes of the events are neglected, ignored, and/or not considered when generating the hyperspace and/or embedding the events within the hyperspace. As indicated above, such neglected features may include, but are not limited to, temporal features (e.g., timestamps) of the events. For instance, the hyperspace may not include a dimension that corresponds to and/or correlates with the timestamp or other temporal features of the events. More particularly, a vector embedding of an event may encode any of the various observable, latent, and/or hidden features, other than one or more time-associated features, of the event. That is, a vector embedding may not encode a time-correlated dimension associated with the event. For example, a vector embedding of an event may not include a dimension that corresponds to a timestamp of the event. In some embodiments, at least some of the dimensions of the vector representation may be orthogonal to a dimension that correlates to the event's timestamp. Thus, an event's location within the hyperspace may be independent of the event's timestamp. As discussed above, clustering of events within the hyperspace, based on a degree of relatedness, may not indicate a time-varying activity level (e.g., a bursting or emergent activity level) of the related events. Embedding the related events within the sub-space of a cluster does not encode a time-varying and/or current temporal frequency of an occurrence of the related events. Thus, events included in a particular cluster may be temporally distributed in disparate fashions.

As indicated above, upon embedding the events in the hyperspace, one or more clusters of related events are determined. Various unsupervised or supervised ML methods may be employed to determine or identify clusters. In one embodiment, for each event in the hyperspace, the k-nearest neighboring events (or points representing the embedded events) are determined, where k is an adjustable parameter of the embodiments. An L2 norm may be employed to define a distance metric between pairs of events. In other embodiments, a norm other than L2 (e.g., L1 (i.e., a Manhattan distance), L3 norm, L4 norm, or the like) may be employed to define the distance metric when determining the k-nearest neighboring events for each event. Potential clusters may be determined from analyzing the k-nearest neighboring events for each event, as described below.

The time-varying temporal distributions of events occurring within clusters may be modeled as an infinite or finite number of states, where the expected temporal distribution for each of the states is characterized by an expected temporal frequency of events. During some runtime periods (e.g., "bursty" periods), the temporal distributions of one or more clusters may become significantly bursty, i.e., a cluster may transition from a state characterized by a relatively low temporal frequency to another state characterized by a relatively high temporal frequency. More specifically, during these bursty temporal periods, it is statistically likely that the cluster has transitioned from a first state associated with a first frequency to a second state associated with a second frequency that is greater than the first frequency. During the bursty temporal period, the observed temporal distribution is statistically more consistent with a second temporal distribution that is characterized by the higher second frequency than is consistent with a second temporal distribution characterized by the lower first frequency. For example, the lower first frequency may be consistent with a historical and/or baseline frequency, and the second frequency may be consistent with a frequency that is temporarily enhanced due to an anomalous issue in the time-series data and/or an environment that generated the time-series data.

In various embodiments, a sub-space of the hyperspace may be bursting with events during a temporal period when events are occurring within the sub-space, where none (or relatively few) events have previously occurred. That is, a sub-space associated with previous "rare" or "new" events types (events localized in a sub-space where previously no, or relatively few, events had been observed) may begin bursting with events that include new, rare or less-frequently observed features. Due to the temporal emergence of an enhancement to the frequency of new or previously rare events, such bursting clusters of related events may be referred to as an emerging and/or an emergent cluster of related events. The emergence of new or rare events may be indicative of an emerging issue (e.g., an anomalous issue) within the time series-data and/or an environment that generated the time-series data. In some embodiments, the terms bursty, bursting, emergent, and emerging may be used interchangeably to refer to a cluster that has, within a temporal period, likely undergone a state transition to a state associated with a temporal distribution of events characterized by a statistically significant increase in the temporal frequency of events.

As indicated above, once a cluster of related events has been identified, a strength (or weight) of temporal "bursty" activity is determined for the cluster. Events of sufficient bursty activity are considered emergent and/or emerging clusters. As used herein, terms such as "bursty," "bursting," "emerging," "emergent," and the like, in reference to a cluster of spatially-related events, refer to the temporal localization, correlation, and/or dispersion/variance of events occurring within the sub-space associated with the cluster. In some embodiments, the strength of the bursty activity of a cluster indicates a state of the cluster associated with a frequency of events occurring within the cluster. Rather than employing one or more dimensions within the hyperspace to encode a temporal variance of the events, a finite-state or infinite-state automaton is employed to characterize and/or monitor, in real-time, the strength of the bursty level.

In some embodiments, the strength of the bursty activity of a cluster indicates a likely state (or a likelihood of a state transition) of the cluster that is characterized by an expected frequency of events occurring within the cluster. The expected frequency of events characterizing a first state of the cluster may be relative to a historical, baseline, and/or expected frequency of events. The bursting strength of a cluster may temporally vary. For example, during a first temporal period, the cluster may be in a first state associated with a first frequency and during a second temporal period, the cluster may be in a second state associated with a second frequency that is significantly greater than the first frequency. During the first temporal period, the cluster may be associated with a first bursting strength (or level) and during the second temporal period, the cluster may be associated with a second bursting strength (or level) that is greater than the first bursting level. In some embodiments, the cluster may be a non-bursting cluster during the first temporal period and be a bursting cluster during the second temporal period. More specifically, a cluster with a current bursting strength that is relatively large may indicate that a recent state transition from a state associated with a relatively low frequency of events to another state associated with a relatively high frequency of events. Thus, the current bursting strength or level indicates a relative comparison of a current event frequency to the event frequency associated with other temporal periods. In the above example, during the second temporal period, the second state of the cluster is characterized by the higher second frequency of events occurring, than the lower first frequency characterizing the first state of the cluster during the first period.

A finite-state automaton or an infinite-state automaton, depending on whether a finite number or an infinite number of frequency-dependent states are used to model the temporal dispersion of events within a cluster, is employed to determine a likelihood of a cluster state transition from a non-bursty state to a bursty state. That is, the temporal characteristics of a cluster are modeled as a finite- or infinite-state machine, and the various embodiments detect likely state transitions of the clusters. In some embodiments, the finite- or infinite-state automaton includes and/or employs a Kleinberg burst detection algorithm. In such embodiments, a cost function is employed to determine a consistency between an observed event dispersion during a temporal period and the event dispersion expected for each of the states. The cost function may impose a penalty to transition from a state of lower frequency to a state of higher frequency, but no cost is incurred from transitions from a state of higher frequency to a state of lower frequency.

By determining, for each cluster, a most-likely sequence of observed states, based on the timestamps of the events in the cluster, the cost function is minimized (or at least decreased) for each cluster. The most-likely sequence of states indicates one or more likely state transitions, and thus a current level of the bursting strength (i.e., a current bursting level) for the cluster. Hypothesis testing is then performed on each cluster to determine a likelihood that the cluster is a temporally emergent (i.e., "bursting") cluster, as compared to the likelihood that the cluster is not a temporally emergent (i.e., "not bursting) cluster. In the hypothesis testing, the null hypothesis is that the cluster is not currently "bursting," meaning that the temporal frequency of events within the cluster is consistent with a background or baseline frequency of events. The alternative hypothesis is that the cluster is currently "bursting," meaning that the temporal frequency of events within the cluster is currently enhanced, as compared to the background or baseline frequency. Clusters with a bursting likelihood score above a bursting threshold are considered to be a potentially emergent (or bursting) cluster associated with an anomalous issue within the time-series data. That is, a set of potentially bursting clusters (PBCs) is generated Noisy clusters are filtered and/or pruned from the set of PBCs, based on their bursting likelihood. Redundant PBCs included in the filtered set are aggregated based on overlapping sub-spaces within the hyperspace. After filtering and aggregating, PBCs with a bursting likelihood score above a likelihood threshold are considered to be a bursting (or emergent) cluster associated with an anomalous issue within the data stream. That is, a set of bursting clusters is generated from the "surviving" and/or non-redundant PBCs of the set of PBCs. The set of bursting clusters may be ranked based on the bursting likelihood scores. One or more notifications regarding an anomalous issue associated with the one or more highly-ranked bursting clusters may be provided.

As discussed elsewhere, conventional methods of detecting emergent and/or bursty clusters rely on scanning a time-window of pre-defined width across time-series data. The temporal distribution of events within the time-window are compared to the statistical distribution of events within a larger portion of the time-series data. The performance of such conventional "time-window comparison" approaches is degraded under various conditions within the time-series data. The results of these conventional methods are sensitive to the selection of the width of the time-window. For example, for clusters that emerge over timespans that are significantly incommensurate with the selected width of the time-window, conventional approaches are prone to both type I and type II errors. For a cluster emerging over temporal periods longer than the width of the window, conventional methods may fail to detect the cluster, or erroneously detect multiple discrete emerging clusters, rather than the single slowly-emerging clusters. For clusters emerging over temporal periods shorter than the width of the window, conventional methods may also fail to detect the cluster, or erroneously detect a single emerging cluster, rather than multiple separate quickly-emerging clusters. Also, such conventional methods are sensitive to noise, fluctuations, and other statistical artifacts in the time-series data. The performance of conventional methods also suffers when emerging clusters include infrequently occurring events and/or events with new or infrequently occurring features.

The various embodiments overcome these, and other, performance limitations of conventional methods of detecting emergent (or bursty) clusters. In contrast to conventional methods, the embodiments herein do not rely on comparing a time-window (of arbitrary width) of time-series data to historical time-series data. Rather, the various embodiments first identify clusters of related events within a hyperspace, and employ a state automaton (i.e., a finite-state or infinite-state machine) to determine a burst level (or burst strength) for each of the clusters based on the timestamps of the events included in the cluster. By analyzing the timestamps of the events within a cluster, and modeling the temporal dynamics of the cluster via a state machine, the enhanced embodiments are enabled to detect, in real-time, periods of statistically significant increases (or decreases) in the frequency of events occurring within the clusters, without relying on scanning a time-window of arbitrary width across the time-series data. Potentially bursting (or emergent) clusters are identified by characterizing the clusters with a bursting likelihood score based on the burst level detected by the state automaton. Noisy clusters are filtered from the set potential bursting clusters, and overlapping and/or redundant clusters are aggregated. Bursting clusters are identified via a sufficient bursting likelihood score.

As such, the embodiments herein are not as prone to type I and type II errors, as conventional methods. Furthermore, the embodiments are enabled to more accurately and precisely discriminate between consecutive discrete emergent clusters, and are less likely to erroneously detect multiple clusters, when only a single cluster is bursting. The various embodiments are not as sensitive to noisy or sparse historical data streams, as compared to conventional methods. In further contrast to conventional methods of detecting bursting clusters of events, the embodiments herein are not as likely to fail to detect emerging clusters that include events with new features and/or infrequently occurring events.

As noted elsewhere, securing the performance, integrity, safety, and security of computing and communication/networking systems and environments requires the real-time detection, identification, and notification of emerging clusters of related events within time-series data generated by the various systems and environments. At least because the various embodiments employ a state automaton, rather than a scanning time-window of predefined width, the various embodiments provide clear, significant, and measurable improvements and/or enhancements to the performance, integrity, safety, and security of computing and communication/networking systems and environments. As a non-limiting example, a computing-security or networking-security application, employing the embodiments discussed herein, provides improved security and performance, as compared to applications employing conventional methods.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100; data structures 120, 140, and 160 described in connection to system 200 described in connection to FIG. 2. Data sources 104a and 104b through 104n may be discrete from user devices 102a and 102b through 102n and server 106 or may be incorporated and/or integrated into at least one of those components. In one embodiment, of data sources 104a through 104n comprise sensors 103a, 107, which may be integrated into or associated with the user device(s) 102a, 102b, or 102n or server 106. Examples of sensed user data made available by data sources 104a through 104n may include events. Thus, any device in FIG. 1 may server as an event source in FIG. 2.

Figure 2:
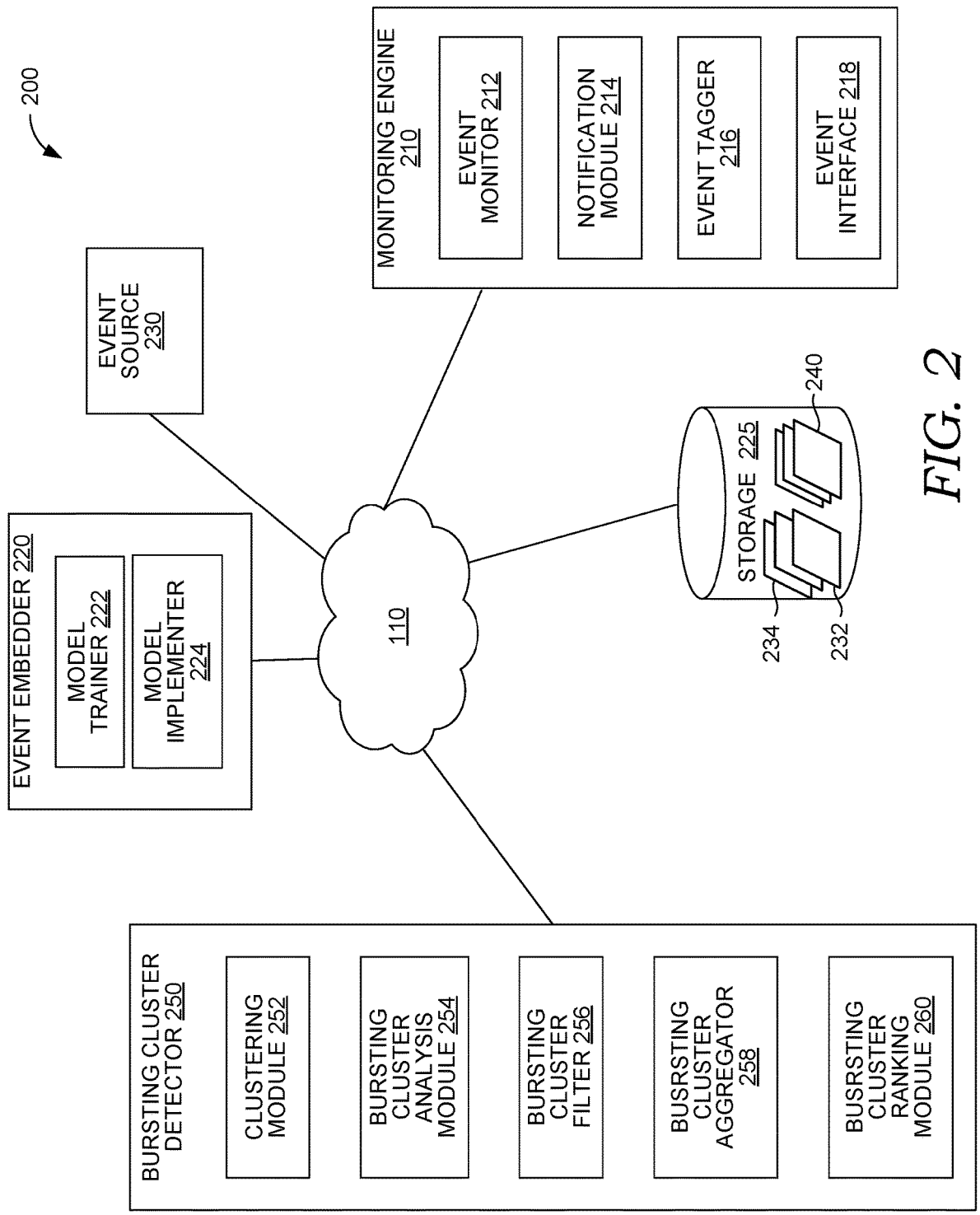
FIG. 2 is a block diagram illustrating an enhanced system in which some embodiments of the present disclosure may be employed.

Operating environment 100 can be utilized to implement a component of the components of enhanced event classification system 200, described in FIG. 2, including components for automatically detecting and identifying events or issues, and classifying sequences objects in a stream as being associated with one or more of the events or issues. Operating environment 100 also can be utilized for implementing aspects of process flows 300, 400, 500, 540, 600, 700, and 800 described in conjunction with FIGS. 3-8.

Referring now to FIG. 2, in conjunction with FIG. 1, a block diagram is provided showing aspects of an example computing system architecture suitable for implementing an embodiment of the disclosure and designated generally as an enhanced system 200 for the real-time detection and notification of emerging issues within a stream of time-series data. That is, enhanced system 200 is enabled to monitor time-series data, and in real-time (or at least near real-time) detect temporally emergent (or bursty) clusters within the time-varying time-series data. As discussed throughout, clusters of related events, which are temporally emergent (or "bursty") within time-series data, provide signals that indicate anomalous issues within the time-series data. A temporally emergent or bursting cluster may be a cluster that is currently experiencing an unexpected and/or sudden increase in the temporal frequency of related events. System 200 may be employed to secure the performance, integrity, safety, and security of computing and communication/networking applications, systems, platforms, and environments by performing the real-time detection, identification, and notification of clusters of related events, which emerge and/or burst within time-series data generated by the various systems and environments To enable system 200, system 200 may include a bursting cluster detector 250, an event embedder 220, a monitoring engine 210, an event source 230, and storage 225. Each of these components may be communicatively coupled via a generalized communication network 110. In general, event source 230 may provide system 200 with time-series data that includes a plurality of events. Monitoring engine 210 may monitor, in real-time (or at least near real-time) the received time-series data. Event embedder 220 may embed the events within a hyperspace. Bursting cluster detector 250 may detect temporally bursting or emergent clusters of related-events within the hyperspace, and rank the bursting clusters based on corresponding bursting activity levels. Monitoring engine 210 may provide real-time notifications of high-ranking bursting or emergent clusters, which are indicative of anomalous issues within the time series data.

FIG. 2 is not intended to be limiting and other arrangements and elements can be used in addition to or instead of those shown in system 200, and some elements may be omitted altogether for the sake of clarity. Further, as with operating environment 100 of FIG. 1, many of the elements described herein are functional entities that may be implemented as discrete or distributed components or in conjunction with other components, and in any suitable combination and location. The functionality of system 200 may be provided via a software as a service (SAAS) model, e.g., a cloud and/or web-based service. In other embodiments, the functionalities of system 200 may be implemented via a client/server architecture.

In a non-limiting embodiment, enhanced system 200 is deployed to monitor events associated with computing and/or communication networking applications. For example, system 200 may monitor computing and/or network security-related events. The detection and/or identification of an emergent (or bursty) cluster or related events, within the security-related events, may be indicative of nefarious-user activity or the emergence of a security-related issue associated with the security of computing and/or communication networking applications. In some non-limiting embodiments, a real-time notification may be provided to indicate one or more anomalous conditions associated with the detected emergent cluster. In some embodiments, the security-related events within the emergent cluster, or the nefarious-user activity that is giving rise to the emergence of the anomalous issue, may be quarantined, isolated or even terminated. For example, the access rights of the offending user may be withdrawn and/or the user's ability to access the functionalities of the application may be terminated.

In such embodiments, event source 230 may be a computing and/or network security application that provides a data stream of security-related events to system 200. Monitoring engine 210 may monitor, in real-time, the security-related events and event embedder 220 may embed the security-related events within a hyperspace. Bursting cluster detector 250 may detect emerging security-related issues via the detection of temporally bursting clusters within the hyperspace. Notification module 214 of monitoring engine 210 may provide one or more notifications indicating emerging anomalous issues (e.g., security-related issues) associated with the detected bursting clusters. Events tagger 216 of monitoring engine 210 may tag, or otherwise identify the security-related events included in the bursting clusters. Because these tagged events are included in one or more emerging clusters, these events may be a portion of the security-related events that are associated with the detected emerging security-related issues. Event interface 218 of monitoring engine 210 may provide the identified portion of security-related events that are associated with the emerging security-related issues. In some embodiments, event interface 218 may provide a graphical user interface (GUI) to a user. The GUI may be employed to provide a user with the various notifications and/or tagged/identified events discussed herein.

It is understood that such computer-security applications of system 200 are non-limiting and that system 200 may be deployed to the real-time detection and notification of emergent clusters within time-series data or a time-varying data stream associated with virtually any types of event and/or applications. For example, system 200 may be deployed to detect the emergence of an increase in crime-related activity associated with a geographic area, the emergence of bug-related issues after the deployment of a software application update, an increase in the up-regulation or down-regulation of gene-expression activity within a genomic dataset, an increase in cosmological activity within a cosmology dataset, an emerging outbreak of an infectious disease, a sudden increase in related user-activity within a social network (e.g., the emergence of a trending topic or subject), the emergence of an increased demand for rideshares in specific neighborhood, and the like.

System 200 models the temporal dynamics of clusters as frequency-dependent states, i.e., the dynamics of the clusters are modeled as a state machine with a finite or infinite number of states, each state being characterized by an expected frequency of occurrence of events. System 200 employs a finite- or infinite-state automaton (e.g., Kleniberg's burst detection algorithm) to detect likely state transitions of the clusters, which are indicative of "bursty" or emergent clusters. System 200 provides clear, significant, and measurable improvements and/or enhancements to the performance, integrity, safety, and security of any application, system, platform, or environment that generates time-series data, which may be subject to anomalous conditions indicated by bursty and/or emergent clusters of related events within the time-series data.

In general, system 200 monitors, in real-time, a stream of timestamped events. For example, the event source 230 may provide system 200 with a data stream of the timestamped events (i.e., time-series data). The events may be received and/or monitored by event monitor 212 of the monitoring engine 210. The event embedder 220 may generate a vector representation for each event based on observable, latent, and/or hidden features, aspects, or attributes of the events. As discussed further below, a model trainer 222 of event embedder 220 may train one or more machine learning (ML) models to learn the features of the events. The ML model may be a deep-learned model. The model implementer 224 of the event embedder 220 may employ the ML model to embed the events within a hyperspace spanned by the vector embeddings. Each embedded event may be represented by a point in the hyperspace. Thus, model implementer 224 may generate a set of points within the hyperspace, where each point in the set of points corresponds to a received event.

A clustering module 252 Of bursting cluster detector 250 may identify clusters of related events, via supervised or unsupervised clustering methods, where a distance between any two events within the hyperspace indicates a degree of relatedness of the features of the two events. Bursting cluster analysis module 254 of the bursting cluster detector 250 may employ a finite-state or an infinite-state automaton (e.g., a Kleinberg burst detection algorithm) to determine a strength (or weight) of temporal "bursty" activity for each cluster. The bursting cluster analysis module 254 may perform hypothesis testing on each cluster to determine a likelihood that the cluster is a temporally emergent (i.e., "bursting") cluster, as compared to the likelihood that the cluster is not a temporally emergent (i.e., "not bursting) cluster. That is, the bursting cluster analysis module 254 may determine a bursting likelihood score for each identified cluster. The bursting cluster analysis module 254 may generate a set of potentially bursting clusters (PBCs) based on the bursting likelihoods scores and a bursting likelihood score threshold test.

Bursting cluster filter 256 of bursting cluster detector 250 may filter noisy clusters from the set of PBCs based on their bursting likelihood scores. In at least some embodiments, randomization testing may be employed to filter the set of OBCs. Bursting cluster aggregator 258 of the bursting cluster detector 250 may aggregate redundant PBCs based on overlapping sub-spaces within the hyperspace. After filtering and aggregating the set of PBCs, bursting cluster ranking module 260 of bursting cluster detector 250 may generate a set of bursting clusters by pruning duplicated PBCs from the set of PBCs. The bursting cluster ranking module 260 may rank the set of bursting clusters based on the bursting likelihood scores of the bursting clusters included in the set of bursting clusters. Notification module 214 of the monitoring engine 210 may generate and provide a notification regarding one or more high-ranking bursting clusters within the ranked set of bursting clusters.

As noted above, model implementer 223 embeds events, which are received from event source 220, within a hyperspace. The events are embedded via vector representations that span the hyperspace. The vector embeddings define a set of points within the hyperspace. The hyperspace and the vector embeddings are based on observable, latent, and/or hidden features, aspects, or attributes of the events. More particularly, the dimensions of the hyperspace correspond to and/or correlate with the features, aspects, or attributes of the data encoded in the events. In various embodiments, the features may be orthogonal features of the events. In an "offline mode" mode of system 200, model trainer 222 may employ various forms of supervised and/or unsupervised deep machine learning (ML) methods to determine (or learn) the observable, latent, and/or hidden features, aspects, or attributes of the events. Model trainer 222 may employ events received previous to the offline mode, as training data. Model trainer 222 may determine a deep-learned feature list of the events, which are expected to be received at "runtime," based on the employing ML methods on the events included in the training data. Model trainer 222 may train a ML model to embed events within a hyperspace that corresponds to the feature list. The ML model may be implemented via a deep neural network, such as but not limited to a feedforward neural network or a recurrent neural network.

For instance, in the offline mode, model trainer 222 may employ the training data to train a deep ML model (e.g., a ML model implemented on a deep neural network). The training data may include labeled and/or annotated representative events, e.g., historical events. The representative events may be labeled or annotated to indicate a "ground truth" associated with the events. Via training the ML model, model trainer 222 may "learn" the features and generate a hyperspace including one or more dimensions corresponding to each of the learned features. In at least some embodiments, the model trainer 222 may compress (or otherwise reduce the complexity) of the trained ML model.

For example, model trainer 222 may perform feature selection and/or feature pruning based on the training data. That is, model trainer 222 may reduce the dimensionality of the hyperspace by pruning the deep-learned feature list. The feature list may be pruned to include a subset of features that includes only the most salient, discriminatory, and/or orthogonal/independent features of the learned features. For example, two highly correlated features may be aggregated such that the hyperspace includes only a single dimension corresponding to the two highly correlated features, rather than separate dimensions for the two features. Features with low spatial dispersion and/or low variability may be pruned to reduce the dimensionality of the hyperspace. Model trainer 222 may employ various methods to reduce the dimensionality of the hyperspace and increase the computational tractability of the various embodiments. The reduced-dimensionality hyperspace and vector embeddings may include dimensions corresponding to the pruned list of features. As discussed throughout, once the ML model is trained in the offline mode, and in a "runtime" mode, model implementer 224 may employ the trained ML model to generate the vector representations of events received from event source 230 during runtime.

In some embodiments, various features, aspects, or attributes of the events are neglected, ignored, and/or not considered when training the ML model. Such neglected features may include, but are not limited to, temporal features (e.g., timestamps) of the events. For instance, the hyperspace may not include a dimension that corresponds to and/or correlates with the timestamp or other temporal features of the events. More particularly, a vector embedding of an event may encode any of the various observable, latent, and/or hidden features, other than one or more time-associated features, of the event. That is, a vector embedding may not encode a time-correlated dimension associated with the event. For example, a vector embedding of an event may not include a dimension that corresponds to a timestamp of the event. In some embodiments, at least some of the dimensions of the vector representation may be orthogonal to a dimension that correlates to the event's timestamp. Thus, an event's location within the hyperspace may be independent of the event's timestamp. As discussed above, clustering of events within the hyperspace, based on a degree of relatedness, may not indicate a time-varying activity level (e.g., a bursting or emergent activity level) of the related events. Embedding the related events within the sub-space of a cluster does not encode a time-varying and/or current temporal frequency of an occurrence of the related events. Thus, events included in a particular cluster may be temporally distributed in disparate fashions.

In various embodiments, a set of events is received. For example, event monitor 212 may receive a set of events from event source 230. Model implementer 224 may generate a set of points that correspond to the received set of events. Model implementer 224 may generate the set of points by embedding the events within a hyperspace. As discussed above, model implementer 224 may implement a ML model to embed the events. The ML model may have been previously trained in an offline mode by model trainer 222. As used herein, the set of points may be referred to as $P=(p_1, p_2, \ldots, p_m)$ in $R^n$, where each point $p_i$ is within the n-dimensional hyperspace S, and the set includes m points. Each point in the set of points may be associated with the timestamp ($t_i$) of the corresponding point ($p_i$).

Clustering module 252 may identify clusters of related events, within S, based on P. Events with similar observable, latent, and/or hidden features, aspects, or attributes are considered related events. Thus, the vector embeddings (i.e., the points) of related events are similarly positioned or located within the hyperspace. A cluster of related events are events whose corresponding points are localized within a finite and bounded sub-space (e.g., a hypersphere) of the hyperspace. That is, a cluster of related events is associated with a corresponding sub-space.

Various unsupervised or supervised methods (e.g., k-nearest neighbors) may be employed to identify clusters of related events (i.e., identify the corresponding sub-space). The identification of a cluster is based on the set of points, of which are localized within the identified sub-space that is associated with the cluster.

A degree of relatedness of events is based on a closeness or distance metric for the events within the hyperspace. Thus, a cluster may include (or be associated with a sub-space that includes) a plurality of points corresponding to events with one or more features that are highly correlated, or otherwise have relatively low dispersion/variance in one or more dimensions of the hyperspace. For instance, the events within a cluster may be significantly localized along one or more dimensions of the hyperspace. A degree of relatedness between two events may refer to a correlation, localization, and/or dispersion of features other than temporal features. The timestamps of events within some clusters (e.g., non-bursting or non-emergent clusters) may have relatively low correlation, have significant dispersion/variance, and/or are not highly localized within one or more temporal periods. However, for some clusters (e.g., emergent and/or bursting clusters), the timestamps of included events are highly correlated, have temporal dispersion/variance, and/or are highly localized within one or more temporal periods. In some embodiments, each point in the set of points corresponds to an event with an associated timestamp, a set of timestamps may be generated, $T=\{t_1, t_2, \ldots, t_m\}$, where $t_i$ is the timestamp for the event that corresponds to $p_i$ in P. A one-to-one mapping or correspondence may exists between the set of points and the set of timestamps.

To identify clusters of related events, for each point in the set of points, the k-nearest neighboring points may be determined, where k is an adjustable parameter of the embodiments. An L2 norm (i.e., a Euclidean distance metric) may be employed to define a distance metric between pairs of events. That is, for each point in S, the Euclidean distance to each of the other points in P may be determined. For each point in P, the k-closest other points in P is identified. In other embodiments, a norm other than L2 (e.g., L1 (i.e., a Manhattan distance), L3 norm, L4 norm, or the like) may be employed to define the distance metric when determining the k-nearest neighboring events for each event.

Potential clusters may be determined from analyzing the k-nearest neighboring points for each point, as described below.

For each point in P, the hyperspace surrounding the point may be searched within a finite n-dimensional spatial window, e.g., a hyperspherical sub-space, where n is the dimensionality of S. Clustering module 252 may search the hyperspace surrounding $p_i$ to generate a set of sub-spaces within S, based on $p_i$'s k-nearest neighbors. Thus, a set of sub-spaces may be determined for and/or associated with each point in P. The set of sub-spaces associated with $p_i$ may be referenced as $V_i=\{h_{1,i}, h_{2,i}, \ldots, h_{k,i}\}$, where $h_i$ is a bounded and finite n-dimensional sub-space of S. Each h in $V_i$ may be a symmetrical sub-space, centered about $p_i$, that is $h_{j,i}$ may include at $p_i$ at its center. In a non-limiting embodiment, each $h_{j,i}$ may be a hyperspherical sub-space, centered about $p_i$. There may be a one-to-one mapping or correspondence between each element of $V_i$ and $p_i$'s k-nearest neighbors. Thus, $V_i$ may include k elements. In one embodiment, $h_{j,i}$ may be a sub-space that includes $p_i$ at its center and $p_i$'s jth-nearest neighbor on a boundary surface of $h_{j,i}$. Thus, $h_{j,i}$ is symmetrical a sub-space with $p_i$ at its center and $p_i$'s nearest-nearest neighbor on a boundary surface of $h_{1,i}$. Likewise, $h_{k,i}$ is a sub-space (which may be a symmetric) that includes $p_i$ at its center and $p_i$'s kth-nearest neighbor on a boundary surface of $h_{k,i}$.

As used herein, the terms spherical and sphere may be employed to refer to hyperspheres and hyperspherical sub-spaces of S. Similarly, terms such as space and spatial may be employed to refer to hyperspaces, i.e., spaces with more than three dimensions. As discussed throughout, in some embodiments, a spatial dimension may be a dimension that is not associated with, or corresponding to, temporal aspects or features (e.g., timestamps) of the events. That is, the term spatial dimension may exclude one or more temporal or time dimensions. The choice of a hyperspherical sub-space for a finite spatial window (or template) is non-limiting, and other spatial-geometric templates may be employed, e.g., hyperelipitical, hyperellipoid, hyperconic, hypercubic, and the like.

To determine and/or generate $V_i$ for $p_i$, clustering module 252 perform the search by starting with the smallest symmetrical sub-space (the spatial window), e.g., a spherical sub-space, that includes both $p_i$ and $p_i$'s nearest neighboring point, where $p_i$ is the center of the sub-space. This starting sub-space may be included in $V_i$ as $h_{1,i}$ and $h_{2,i}$ may be determined by symmetrical inflating or expanding $h_{1,i}$ to include $p_i$'s second-nearest neighboring point. Thus, $V_i$ may be determined and/or generated by iteratively expanding it elements, starting with $h_{1,i}$. That is, $h_{j,i}$ may be determined by inflating $h_{j-1,i}$ to include the next-nearest point to $p_i$. As used herein, $h_{j,i}$ may be referred to as a cluster. Thus, each point included in P is associated with k clusters, where each cluster includes at least $p_i$ at its center and one of its k-nearest neighbors on a bounding surface. Clustering module 252 may determine and/or generate, for each $h_{j,i}$ a subset of P, where each point included in the subset is included in the cluster $h_{j,i}$. Likewise, clustering module 252 may determine and/or generate, for each $h_{j,i}$ a subset of T, where each timestamp included in the subset of T is the timestamp associated with a point included in $j_{j,i}$. That is, clustering module 252 may generate, for each cluster, a set of event times based on the timestamps associated with the subset of points included in the cluster. The set of event times associated with cluster $h_{j,i}$ may be referenced as $\theta_{j,i}$. As used herein, and for clarify of reading, the i-th subscript may be omitted, and it is implicitly acknowledge. For example, for clarity $h_{j,i}$ may be referenced simply as $h_j$. Likewise, referencing a particular $\theta_{j,i}$, the notation may be simplified to $\theta$.

Bursting cluster analysis module 254 may determine and/or generate a set of potentially bursting clusters (PBCs) based on each $V_i$ generated by clustering module 252. That is, via analyzing the timestamps corresponding to each of the points included in each $h_j$ included each $V_i$, bursting cluster analysis module 254 may generate a set of PBCs. The time-varying temporal distributions of events occurring within clusters may be modeled as an infinite or finite number of states, where the expected temporal distribution for each of the states is characterized by an expected temporal frequency of events. During some periods (e.g., "bursty" periods), the temporal distributions of one or more clusters may become significantly bursty, i.e., a cluster may transition from a state characterized by a relatively low temporal frequency to another state characterized by a relatively high temporal frequency. More specifically, during these bursty temporal periods, it is statistically likely that the cluster has transitioned from a first state associated with a first frequency to a second state associated with a second frequency that is greater than the first frequency. During the bursty temporal period, the observed temporal distribution is statistically more consistent with a second temporal distribution that is characterized by the higher second frequency than is consistent with a second temporal distribution characterized by the lower first frequency. For example, the lower first frequency may be consistent with a historical and/or baseline frequency, and the second frequency may be consistent with a frequency that is temporarily enhanced due to an anomalous issue in the time-series data and/or an environment that generated the time-series data.

In various embodiments, one or more $h_j$s in one or more $V_i$s may be bursting with points during a temporal period points are occurring within $h_j$, where none (or relatively few) events have previously occurred. That is, $h_j$ may be a sub-space that is associated with previous "rare" or "new" events types (events localized in a sub-space where previously no, or relatively few, events had been observed) may begin bursting with events that include new, rare or less-frequently observed features. Due to the temporal emergence of an enhancement to the frequency of new or previously rare events, such bursting clusters of related events may be referred to as an emerging and/or an emergent cluster of related events. The emergence of new or rare events may be indicative of an emerging issue (e.g., an anomalous issue) within the time series-data and/or an environment that generated the time-series data.

As indicated above, once a cluster of related events has been identified, a strength (or weight) of temporal "bursty" activity is determined for the cluster. Events of sufficient bursty activity are considered emergent and/or emerging clusters. In some embodiments, the strength of the bursty activity of a cluster indicates a state of the cluster associated with a frequency of events occurring within the cluster. Bursting cluster analysis module 254 may employ a finite-state or infinite-state automaton (e.g., a Kleinberg-like burst detection algorithm) to characterize and/or monitor, in real-time, the strength of the bursty level.

In some embodiments, the strength of the bursty activity of a cluster indicates a likely state (or a likelihood of a state transition) of the cluster that is characterized by an expected frequency of events occurring within the cluster. The expected frequency of events characterizing a first state of the cluster may be relative to a historical, baseline, and/or expected frequency of events. The bursting strength of a cluster may temporally vary. For example, during a first temporal period, the cluster may be in a first state associated with a first frequency and during a second temporal period, the cluster may be in a second state associated with a second frequency that is significantly greater than the first frequency. During the first temporal period, the cluster may be associated with a first bursting strength (or level) and during the second temporal period, the cluster may be associated with a second bursting strength (or level) that is greater than the first bursting level. In some embodiments, the cluster may be a non-bursting cluster during the first temporal period and be a bursting cluster during the second temporal period. More specifically, a cluster with a current bursting strength that is relatively large may indicate that a recent state transition from a state associated with a relatively low frequency of events to another state associated with a relatively high frequency of events. Thus, the current bursting strength or level indicates a relative comparison of a current event frequency to the event frequency associated with other temporal periods. In the above example, during the second temporal period, the second state of the cluster is characterized by the higher second frequency of events occurring, than the lower first frequency characterizing the first state of the cluster during the first period.

A finite-state automaton or an infinite-state automaton, depending on whether a finite number or an infinite number of frequency-dependent states are used to model the temporal dispersion of events within a cluster, is employed to determine a likelihood of a cluster state transition from a non-bursty state to a bursty state. That is, the temporal characteristics of a cluster are modeled as a finite- or infinite-state machine, and the various embodiments detect likely state transitions of the clusters. In some embodiments, the finite- or infinite-state automaton includes and/or employs a Kleinberg burst detection algorithm. In such embodiments, a cost function is employed to determine a consistency between an observed event dispersion during a temporal period and the event dispersion expected for each of the states. The cost function may impose a penalty to transition from a state of lower frequency to a state of higher frequency, but no cost is incurred from transitions from a state of higher frequency to a state of lower frequency.

Bursting cluster analysis module 254 may determine, for each cluster (i.e., for each $h_j$ of each $V_i$), a most-likely sequence of observed states, based on the timestamps of the points in $h_j$. For cluster $h_{j,i}$, the most-likely sequence may be determined based on the subset of points included in $h_{j,i}$, as well as $\theta_{j,i}$, i.e., the set of event times that are based on the timestamps associated with the subset of points included in $h_{j,i}$. Bursting cluster analysis module 254 may determine the sequence of state by minimizing (or at least reducing) the cost function for each $h_j$ of each $V_i$. The most-likely sequence of states indicates one or more likely state transitions, and thus a current level of the bursting strength (i.e., a burst level) for the cluster. In some embodiments, bursting cluster analysis module 254 employs a Kleinberg burst detection algorithm to determine at least a burst level (BL), a burst start time (BST) and a burst end time (BET) for each $h_j$ of each $V_i$.

If a particular $h_j$ has a BL greater than a BL threshold, the associated BST is more recent than a BST threshold, and the BET is more distant than a BET threshold, then bursting cluster analysis module 254 may perform hypothesis testing on the particular $h_j$ to determine a likelihood that the cluster is a temporally emergent (i.e., "bursting") cluster, as compared to the likelihood that the cluster is not a temporally emergent (i.e., "not bursting) cluster. That is, for each $h_{j,i}$ bursting cluster analysis module 254 may determine a bursting likelihood score based on the corresponding set of event times, i.e., $\theta_{j,i}$. In the hypothesis testing, the null hypothesis, referenced as $H_0$, is that the cluster is not currently "bursting," meaning that the temporal frequency of events within the cluster is consistent with a background or baseline frequency of events. The alternative hypothesis, referenced as $H_1$, is that the cluster is currently "bursting," meaning that the temporal frequency of events within the cluster is currently enhanced, as compared to the background or baseline frequency. Clusters with a bursting likelihood score above a bursting threshold are considered to be a potentially emergent (or bursting) cluster associated with an anomalous issue within the time-series data. That is, a set of potentially bursting clusters (PBCs) is generated.

More particularly, for each $h_{j,i}$, a subset of P is determined, where each point included in the determined subset is included in $h_{j,i}$. The set of event times (i.e., the subset of timestamps T) associated with the points within $h_{j,i}$ is determined, i.e., $\theta_{j,i}$. Bursting cluster analysis module 254 may perform a burst detection (e.g., by employing a state automaton) on each cluster based on $\theta_{j,i}$. As noted above, a Kleinberg burst detection algorithm may be employed to determine a BL, a BST, and a BET for each cluster.

The bursting cluster analysis module 254 may then perform the hypothesis testing. In at least one embodiment, hypothesis testing may be performed on a cluster if and only if the determined BL is greater than 0.0, the BST is at most a week old, as compared to the current time (to eliminate old bursts from the analysis), and BET is not in the past, i.e., the cluster is currently bursting. If a cluster satisfies these (and/or other threshold tests for being a potentially bursting cluster), then the hypothesis testing may be performed based on the time-series data. Bursting cluster analysis module 254 may determine the bursting likelihood score ($lr_{j,i}$) for the cluster $h_{j,i}$ based on the hypothesis testing via the following expressing:

$$lr_{j,i}(h_{j,i}) = \frac{Pr(\text{Data} | H_1(h_{j,i}))}{Pr(\text{Data} | H_0(h_{j,i}))},$$

where data represents the time-series data, $Pr(\text{Data}|H_0(h_{j,i}))$ is probability that the null hypothesis (i.e., the event activity level within the cluster is consistent with the background levels) is true, and $Pr(\text{Data}|H_1(h_{j,i}))$ is probability that the alternative hypothesis (i.e., the event activity level within the cluster is enhanced, as compared to the background levels). After calculating $lr_{j,i}(h_{j,i})$ for each cluster associated with a point, the clusters may be ranked based on the values of lr. In at least some embodiments, lr is set equal to 0.0 if the cluster does not pass one or more of the above discussed threshold tests. Bursting cluster analysis module 254 may generate the set of PBCs by including the cluster, for each point, that has the largest bursting likelihood score based on the ranking of the clusters. The set of PBCs may be referred to as $R=(r_1, r_2, \ldots, r_l)$.

Bursting cluster filter 256 may filter and/or prune noisy clusters from the set of PBCs, based on their bursting likelihood scores. Bursting cluster aggregator 258 may aggregate redundant PBCs included in the filtered set of PBCs based on overlapping sub-spaces within the hyperspace. After filtering and aggregating, PBCs with a bursting likelihood score above a likelihood threshold may be considered to be a bursting (or emergent) cluster associated with an anomalous issue within the data stream. That is, bursting cluster aggregator may generate a set of bursting clusters from the "surviving" and/or non-redundant PBCs of the set of PBCs. Bursting cluster module 260 may tank the set of bursting clusters ranked based on the bursting likelihood scores. Notification module 212 may generate and/or provide one or more notifications regarding an anomalous issue associated with the one or more highly-ranked bursting clusters. Event tagger 216 may identify a subset of events within high-ranking bursting clusters.

More particularly, bursting cluster filter 256 may filter the set of PBCs by performing randomization testing of each PBC ($r_i$) included in R. For each $r_i$ included in R, bursting cluster filter 256 may perform the following process N times, where N is a positive integer that is an adjustable parameter of the various embodiments. For each point ($p_i$) included in PBC r, an associated timestamp ($t_i$) is drawn, from a null distribution, i.e., $t_i \sim P_0(r)$, where $P_0(r)$ is a null distribution of event times, for the PBC, based on the time series data. For example, bursting cluster filter 256 may determine $P_0(r)$ based on an average time between event occurrences before the BST of r, e.g., a historical or baseline frequency of events. A "null cluster" (or non-bursting sub-space) r' for PBC r is generated, where the timestamps associated with the points in r' are determined from the samplings of the null distribution. The bursting likelihood score lr(r') for the null cluster is determined as discussed above.

A p-value for the PBC is determined as $$\frac{N^*}{N},$$

where N* is the number of times that lr(r')>lr(r). If the p-value is less than a confidence threshold ($\alpha$), for example 0.5, then it is unlikely that a burst would occur within this sub-space of the hyperspace by chance. That is, if the p-value for the PBC is greater than a p-value and/or confidence threshold, then the PBC may be bursting due to noise in the time-series data and the noisy PBC is pruned and/or removed from the set of PBCs.

Bursting cluster aggregator 258 may aggregate PBCs within the filtered set of PBCs by finding spatially overlapping PBCs within R. Such overlapping PBCs are likely to be a result of the same emerging anomalous issue within the time-series data. Bursting cluster aggregator 258 may aggregate PBCs as follows. A set of sets of overlapping PBCs may be generated from the filtered set of PBCs. The set of set of overlapping PBCs is referred to as $O=(O_1, O_2, \ldots, O_s)$, where $O_i$ is the i-th set of overlapping PBCs. O may be referred to as an aggregated set of PBCs. Bursting cluster aggregator 258 may loop through the filtered set of PBCs, and for a particular r in the set of PBCs, if r is not already included in an element of O (i.e., $r \notin O_i$, for any $O_i$ in O), then a new element is added to O that includes r. As looping through R is continued, any other PBC that overlaps with r is included in the new element that that was added to O and corresponds to r. That is, for all r' that overlaps with r ($r \cap r' \neq \emptyset$) and not already included in a connected PBC, then $O_{r'}$ is added to O. This is repeated until there are no more overlapping PBCs within the set of PBC.

Bursting cluster aggregator 258 may generate a set of bursting clusters by pruning any duplicated PBCs from the aggregated set of PBCs. In at least one embodiment, for each $O_i$ in O, the PBC with the highest bursting likelihood score ($O_i$) in is kept and each of the other PBCs included in $O_i$ are removed and/or pruned. That is, for each $O_i$, the corresponding lr(r)s are compared, and the PBC with the highest lr(r) is added to a set of bursting clusters. For example, the most likely bursting PBC included in each $O_i$ is identified and added to the set of bursting clusters.

The components of enhanced system 200 may be embodied as a set of compiled computer instructions or functions, program modules, computer software services, or an arrangement of processes carried out on a computer system. It should be understood that the system 200 shown in FIG. 2 is an example of one system in which embodiments of the present disclosure may be employed. Each component shown may include a computing device similar to the computing device 900 described with reference to FIG. 9. The enhanced system 200 should not be interpreted as having any dependency or requirement related to any single module/component or combination of modules/components illustrated therein. Each may comprise a single device or multiple devices cooperating in a distributed environment. For instance, the system 200 may comprise multiple devices arranged in a distributed environment that collectively provide the functionality described herein. Additionally, other components not shown may also be included within the network environment. It should be understood that the system 200 and/or its various components may be located anywhere in accordance with various embodiments.

Example system 200 also includes storage 225. Storage 225 generally stores information including data, computer instructions (e.g., software program instructions, routines, or services), and/or models used in embodiments of the technologies described herein. In an embodiment, storage 225 comprises a data store 234 (or computer data memory). Data store 234 may store a stream of sequence and/or labelled training data. Storage 225 may also include pattern inference logic 232. Briefly, pattern inference logic 232 may include machine learning, statistical, and/or artificial intelligence logic that is enabled to detect, infer, or otherwise recognize patterns and or features within data. For instance, pattern inference logic 232 may infer explicit, latent, or hidden pattern recognition features or patterns within the training data. Further, although depicted as a single data store component, storage 225 may be embodied as a data store or may be in the cloud.

By way of example and not limitation, data included in storage 225, as well as any user data, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; etc.) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, date or information (e.g., the requested content) may be provided in user signals. A user signal can be a feed of various data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources.

As noted above, pattern inference logic 232 may contains the rules, conditions, associations, classification models, and other criteria to execute the functionality of any of the components, modules, analyzers, generators, and/or engines of systems 200. Storage 225 may include event store 240. Event store 240 may include historical events and/or time-series data analyzed by bursting cluster detector 250.

Figure 3:
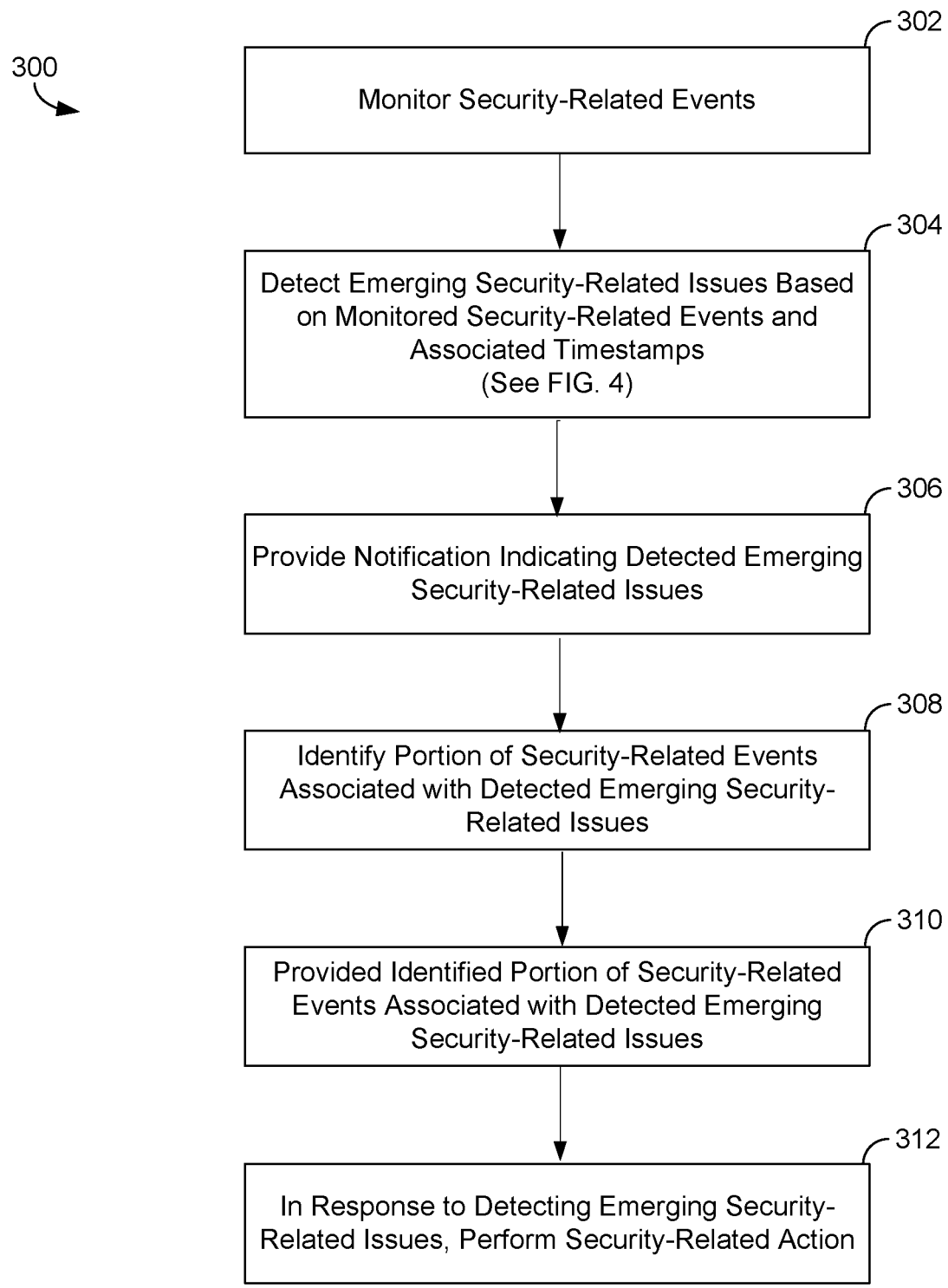
FIG. 3 provides a flow diagram that illustrates a process for the enhanced real-time monitoring, detection, and notification of computer security-related issues that is consistent with some of the embodiments.

Turning now to FIG. 3, where a flow diagram is provided that illustrates a process 300 for the enhanced real-time monitoring, detection, and notification of computer security-related issues of the present disclosure. At least portions of process 300 may be enabled by, performed by, and/or carried out by devices and/or components included in operating environment 100 of FIG. 1 and/or enhanced system 200 of FIG. 2.

Process 300 begins at block 302, where events are monitored. The events may be security-related events. The events may be monitored in real-time, or at least near real-time. For example, event monitor 212 of FIG. 2 may receive time-series data (or a data stream) from event source 230 of FIG. 2. The security-related events may be generated via one or more computing environments, platforms, and/or systems. The computing environments, platforms, and/or systems may include one or more applications or sub-applications that are directed towards security concerns, e.g., a monitoring engine and/or a bursting detector cluster, such as but not limited to monitoring engine 250 and bursting cluster detector 250 of FIG. 2. The time-series data may include computer security-related events. At block 304, emerging security-related issues may be detected within the monitored time-series data. Various embodiments for detecting emerging security-related issues are discussed in conjunction with at least process 400 of FIG. 4. However, briefly here, the emerging security-related issued may be detected in real-time, or at least near real-time, based on a bursting cluster of related events analysis. For instance, bursting cluster detector 250 of FIG. 2 may analyze the time-series data to detect emerging and/or bursting clusters of related events within the data stream. The detected emerging and/or bursting cluster may be a signal indicating an emerging anomalous issue within the time-series data, such as but not limited to a security-related issue.

At block 306, a notification indicating the emerging security-related issue is provided. The notification may be provided to a user. For example, notification module 214 of FIG. 2 may provide the notification. Event interface, also of FIG. 2, may provide the notification within a graphical user interface (GUI) to the user. At block 308, a portion of the security-related events that are associated with the detected emerging issue are identified and/or tagged. In at least one embodiment, the identified events may be included in the bursting cluster that is indicative of the emerging issues. Event tagger 216 of FIG. 2 may tag the identified events. At block 310, the identified portion of security-related events are identified. Event interface 218 may provide the identified events to a user via the GIU.

At block 312, in response to detecting the one or more emerging security-related issues, a security-related action may be performed. That is, a security-related remedial action may be performed in response to the detection of the emergent security-related issue and/or emergent cluster. The performance of the security-related action (e.g., a response) may be an automatic response, a manual response, or a combination thereof. The action and/or response may be based on and/or affect the events included in the emergent cluster associated with the emergent issue and/or activity. In one non-limiting embodiment, the security-related action and/or response may include quarantining, isolating, or even terminating activating associated with the events included in the emergent cluster associated with the emergent issue. In some embodiments, the security-related events within the emergent cluster, may be indicative of nefarious-user activity associated with the security of computing and/or communication networking applications. The access rights of the offending user may be withdrawn and/or the user's ability to access the functionalities of the application may be terminated in such embodiments. In some embodiments, the ability of one or more computing devices associated with the offending user may be terminated. For example, each computing device that the user has previously employed to access the system may quarantined and/or quarantined from the system. To isolate and/or limit any potential damage to computing resources, including user data, at least a portion of (e.g., functionalities, operations, and/or sub-systems) the computing environment, platform, and/or system may be terminated, temporarily disabled, and/or taken offline. Thus, any privacy concerns regarding user data may be managed, limited, and/or mitigated by performing the remedial action. At block 312, various computing machines of the environment, platform, and/or system may be shutdown, rebooted, updated, taken offline, and/or otherwise disabled in response to detecting the emergent issue. More generally, at block 312, the detection and/or identification of the emergent issue may trigger one or more remedial actions.

Figure 4:
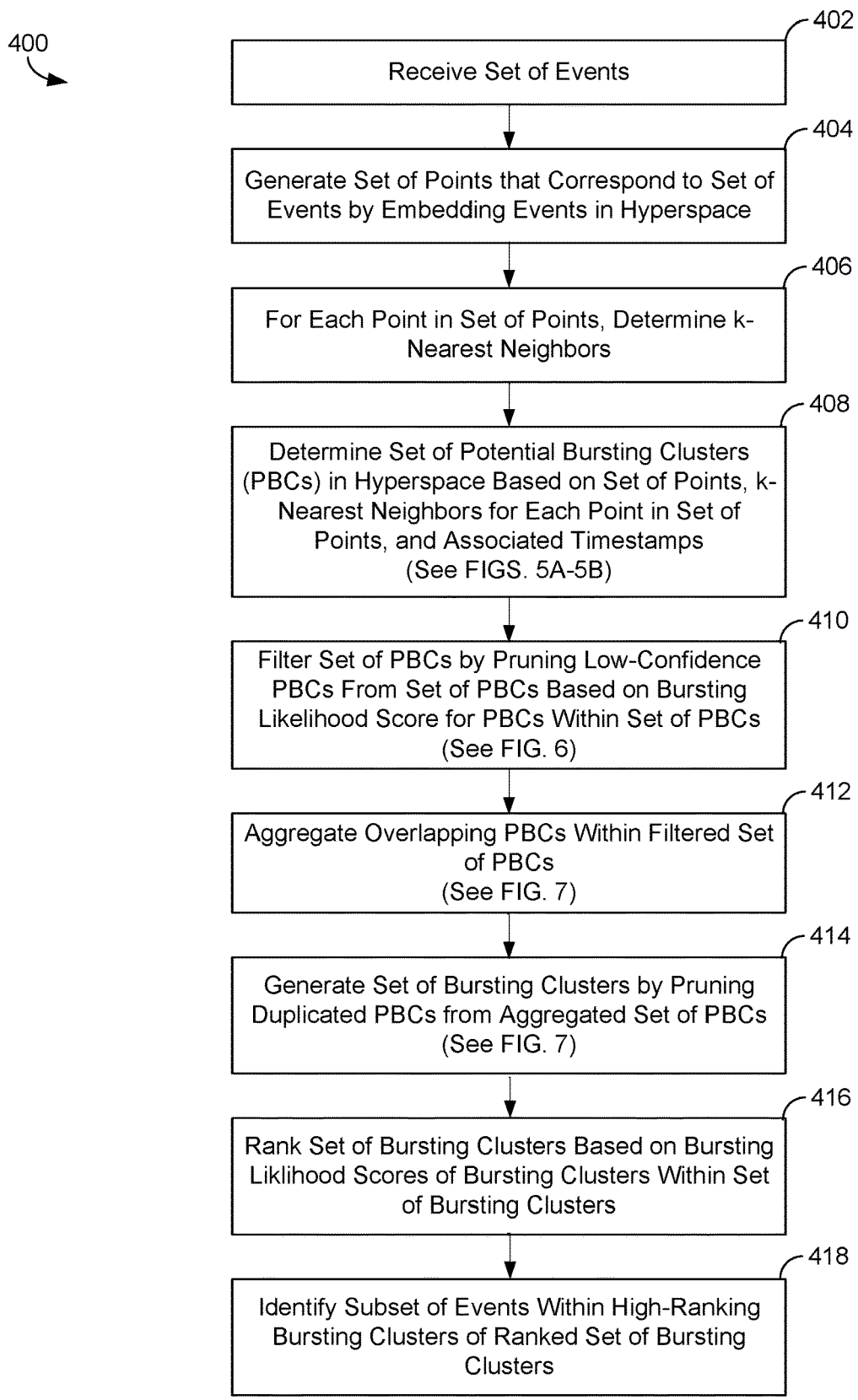
FIG. 4 provides a flow diagram that illustrates a process for the enhanced real-time detection of emergent clusters of related events within time-series data that is consistent with some of the embodiments.

Turning now to FIG. 4, where a flow diagram is provided that illustrates a process 400 for the enhanced real-time detection of emergent clusters of related events within time-series data of the present disclosure. At least portions of process 400 may be enabled by, performed by, and/or carried out by devices and/or components included in operating environment 100 of FIG. 1 and/or enhanced system 200 of FIG. 2.

Process 400 begins, at block 402, where a set of events is received. In some embodiments, event monitor 212 of FIG. 2 receives a set of events from event source 230 of FIG. 2. The events may be included in a data stream, such as but not limited to time-series data. Each received event may have an associated temporal attribute, such as a timestamp. In various embodiment, receiving a set of events may include receiving indications of a plurality of events. At noted throughout, the events may be security-related events. Each of the plurality of events may have an associated event time (e.g., a timestamp).

At block 404, a set of points that correspond to the set of events are generated. The set of points may be referenced as set P, may be generated by embedding the set of events within hyperspace S. Each point in the set of points may have a one-to-one correspondence with an event in the received set of events. Thus, each point in the set of points may be associated with the timestamp of the corresponding event. In some embodiments, model implementer 224 of FIG. 2 may embed the set of events within the hyperspace, via a trained machine learning (ML) model. Model trainer 222 of FIG. 2 may train the ML model, via training data stored in storage 225 of FIG. 2. In some embodiments, and as discussed throughout, a plurality of features may be determined for each of the events. That is, the events may be "featurized." The set of points may be generated based on the determined features.

At block 406, the k-nearest neighbors for each point in set P may be determined. In various embodiments, clustering module 252 of FIG. 2 may employ a distance metric to determine the k-nearest neighbors of each point. In at least one embodiment, the distance metric may be a similarity metric that characterizes a similarity of the features of the events. Thus, a block 406, a similarity metric may be determined. The k-nearest neighbors mays be determined based on the similarity metric.

At block 408, a set of potential bursting clusters (PBCs) within the hyperspace is determined. Various embodiments of determining and/or generating a set of PBCs are discussed in conjunction with at least FIGS. 5A-5B. However, briefly here, bursting cluster analysis module 254 may determine the set of PBCs based on the set of points, the k-nearest neighbors for each point in the set of points, and the timestamps associated with each point in the set of points. In some embodiments, the similarity metric is utilized to determine the PBCs. Bursting cluster analysis module 254 may employ a finite-state automaton or an infinite-state automaton to detect emergent and/or bursty clusters of related-events within the time-series data. In at least one embodiment, a Kleinberg burst detection algorithm is employed to detect emergent and/or bursty clusters. A bursting likelihood score may be determined for each PBC based on hypothesis testing. In some embodiments, the bursting score represents a temporal frequency associated with the event times of the events included in the PBCs At block 410, the set of PBCs is filtered by pruning low-confidence PBCs from the set of PBCs. Various embodiments of filtering the set of PBCs are discussed in conjunction with at least process 600 of FIG. 6. However, briefly here, bursting cluster filter 256 of FIG. 2 may prune low confidence and/or noisy PBCs from the set based on the bursting likelihood score for each PBC within the set of PBCs.

At block 412, overlapping PBCs within the set of PBCs are aggregated. Various embodiments of aggregating overlapping PBCs are discussed in conjunction with at least process 700 of FIG. 7. However, briefly here, bursting cluster aggregator 258 of FIG. 2 may determine the most likely bursting PBC from sets of overlapping PBCs. In some embodiments, at least a portion of the PBCs may be aggregated based on the intersections of common events included in the aggregated PBCs.

At block 414, a set of bursting clusters may be generated from the filtered and aggregated set of PBCs. Various embodiments of generating and/or determining a set of bursting clusters are discussed in conjunction with at least process 700. However, briefly here, bursting cluster aggregate may prune away any redundant and/or duplicated PBCs from the filtered and aggregated set of PBCs.

At block 416, the set of bursting clusters is ranked. In various embodiments, bursting cluster ranking module 250 of FIG. 2 may rank the set of bursting clusters based on the bursting likelihood scores of the bursting clusters within the set of bursting clusters. An emerging issue related to the events included in a highest-ranking cluster may be determined. The determined issue may be an emerging security-related issue. At block 418, a subset of events included in the high-ranking bursting clusters are identified and/or tagged. For example, event tagger 216 may tag and/or identify events within the time-series data, of which the corresponding points, are within one or more highly-ranked bursting clusters. Notification module 214 of FIG. 2 may provide the identified events and/or one or more notifications regarding the high-ranking bursting clusters and/or determined emerging issue. Event interface 218 may generate one or more GUIs to provide the notification and/or identified events.

Figure 5A:
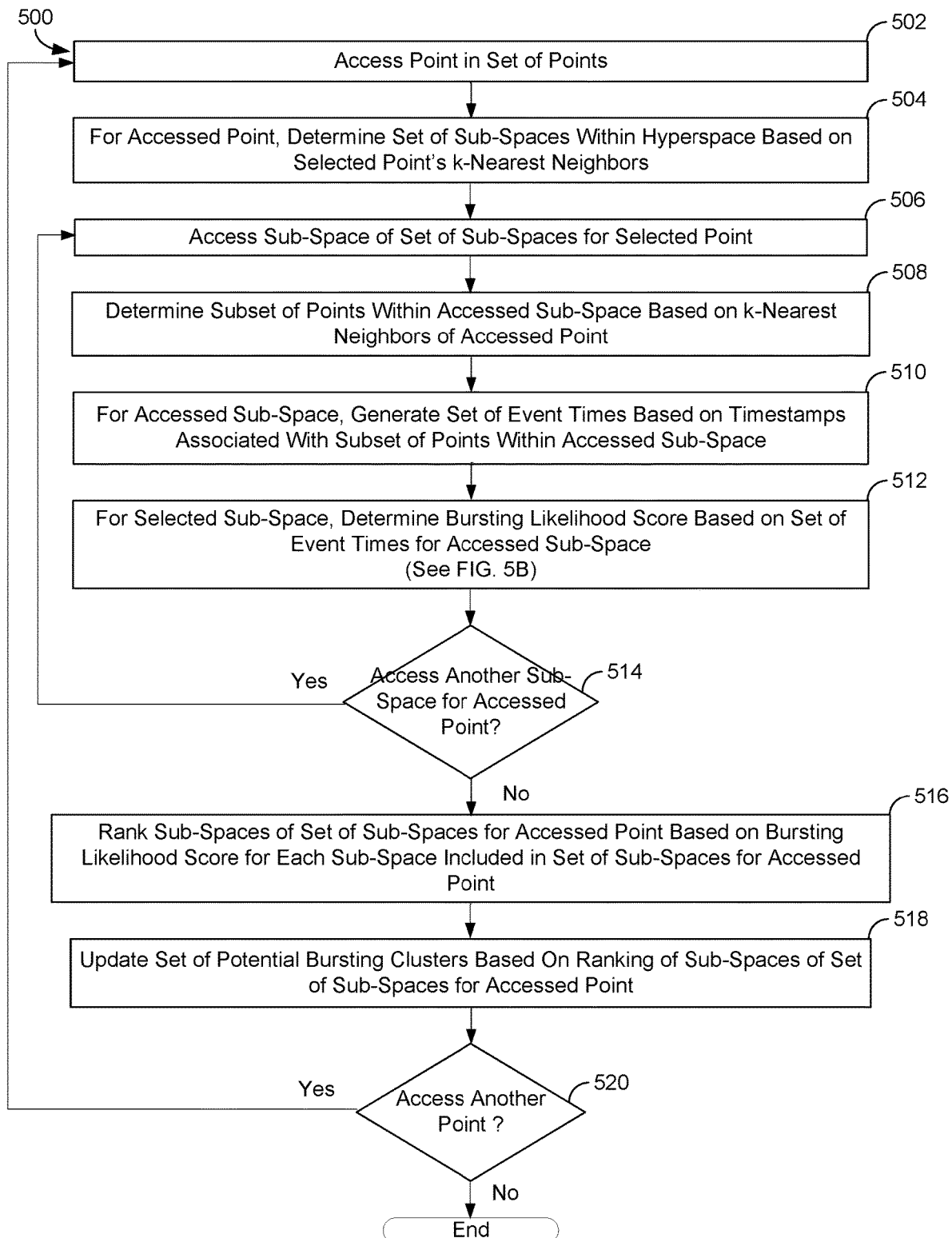
FIG. 5A provides a flow diagram that illustrates a process for the enhanced detection of potentially bursting clusters of related events within time-series data that is consistent with some of the embodiments.

Turning now to FIG. 5A, where a flow diagram is provided that illustrates a process 500 for the enhanced detection of potentially bursting clusters of related events within time-series data of the present disclosure. At least portions of process 500 may be enabled by, performed by, and/or carried out by devices and/or components included in operating environment 100 of FIG. 1 and/or enhanced system 200 of FIG. 2.

At least portions of process 500 may be carried out and/or implemented by various components and/or modules of bursting cluster detector 250 of FIG. 2. Process 500 begins at block 502, where a point in the set of points (P) is accessed. Blocks 502-520 refer to a loop through each point in the set of points. As such, for the first time at block 502, the first point in the set of points may be accessed. Each time through the loop, the next point in the set may be accessed. The loop may be continued until all the points in the set of points have been processed via blocks 502-520. The accessed point may be referred to as $p_i$.

At block 504, a set of sub-spaces within the hyperspace is determined for the accessed point. Clustering module 252 of FIG. 2 may search the hyperspace surrounding $p_i$ to generate a set of sub-spaces within S, based on $p_i$'s k-nearest neighbors. Thus, via the loop associated with blocks 502-520, a set of sub-spaces may be determined for and/or associated with each point in P. The set of sub-spaces associated with $p_i$ may be referenced as $V_i = \{h_{1,i}, H_{2,i}, \ldots, h_{k,i}\}$, where $h_i$ is a bounded and finite n-dimensional sub-space of S. Each h in $V_i$ may be a symmetrical sub-space, centered about $p_i$, that is $h_{j,i}$ may include at $p_i$ at its center. In a non-limiting embodiment, each $h_{j,i}$ may be a hyperspherical sub-space, centered about $p_i$. There may be a one-to-one mapping or correspondence between each element of $V_i$ and $p_i$'s k-nearest neighbors. Thus, $V_i$ may include k elements. In one embodiment, $h_{j,i}$ may be a sub-space that includes $p_i$ at its center and $p_i$'s jth-nearest neighbor on a boundary surface of $h_{j,i}$. Thus, $h_{j,i}$ is symmetrical a sub-space with $p_i$ at its center and $p_i$'s nearest-nearest neighbor on a boundary surface of $h_{1,i}$. Likewise, $h_{k,i}$ is a sub-space (which may be a symmetric) that includes $p_i$ at its center and $p_i$'s kth-nearest neighbor on a boundary surface of $h_{k,i}$.

Blocks 506-514 refer to a loop through the sub-spaces in the set of sub-spaces for the accessed point. That is, blocks 506-514 describe a loop through the elements of $V_i = \{h_{1,i}, h_{2,i}, \ldots, h_{k,i}\}$ for accessed $p_i$. At block 506, a sub-space $h_{j,i}$ is selected. Clustering module 252 may determine and/or generate, for each $h_{j,i}$ a subset of P, where each point included in the subset is included in the cluster (or sub-space) $h_{j,i}$. At block 508, a subset of points within the accessed sub-space is determined based on the nearest k-neighbors of the accessed point. At block 510, a set of event times for the selected sub-space is determined and/or generated. In various embodiments, clustering module 252 may determine and/or generate, for each $h_{j,i}$ a subset of T, where each timestamp included in the subset of T is the timestamp associated with a point included in $h_{j,i}$. That is, clustering module 252 may generate, for each cluster, a set of event times based on the timestamps associated with the subset of points included in the cluster. The set of event times associated with cluster $h_{j,i}$ may be referenced as $\theta_{j,i}$.

At block 512, a bursting likelihood score is determined for the accessed sub-space. Various embodiments of determining a bursting likelihood score for the accessed sub-space are discussed in conjunction with at least process 540 of FIG. 5B. However, briefly here, the bursting likelihood score may be determined based on the set of event times for the selected sub-space. Bursting cluster analysis module 254 may determine, for each sub-space (i.e., for each $h_j$ of each $V_i$), a most-likely sequence of observed states, based on the timestamps of the points in $h_j$. For cluster (or sub-space) $h_{j,i}$, the most-likely sequence may be determined based on the subset of points included in $h_{j,i}$, as well as $\theta_{j,i}$, i.e., the set of event times that are based on the timestamps associated with the subset of points included in $h_{j,i}$. Bursting cluster analysis module 254 may determine the sequence of state by minimizing (or at least reducing) the cost function for each $h_j$ of each $V_i$. The most-likely sequence of states indicates one or more likely state transitions, and thus a current level of the bursting strength (i.e., a burst level) for the cluster. In some embodiments, bursting cluster analysis module 254 employs a Kleinberg burst detection algorithm to determine at least a burst level (BL), a burst start time (BST) and a burst end time (BET) for each $h_j$ of each $V_i$.

If a particular $h_j$ has a BL greater than a BL threshold, the associated BST is more recent than a BST threshold, and the BET is more distant than a BET threshold, then bursting cluster analysis module 254 may perform hypothesis testing on the particular $h_j$ to determine a likelihood that the cluster is a temporally emergent (i.e., "bursting") cluster, as compared to the likelihood that the cluster is not a temporally emergent (i.e., "not bursting) cluster. That is, for each $h_{j,i}$, bursting cluster analysis module 254 may determine a bursting likelihood score based on the corresponding set of event times, i.e., $\theta_{j,i}$.

At decision block 514, it is determined whether to access another sub-space in the set of sub-spaces for the accessed point. If the k-th (or last) sub-space in the set of sub-spaces has not been accessed, then process 500 returns to block 506 to access another sub-space. If the currently accessed sub-space is the last sub-space in the set of sub-space, then process 500 flows to block 516.

At block 516, the set of sub-spaces for the accessed point are ranked based on the bursting likelihood score. At block 518, the updated set of potentially bursting clusters (PBCs) are updated to include the highest-ranked set of sub-spaces. That is, bursting cluster analysis module 254 may generate the set of PBCs by including the cluster (or sub-space), for each point, that has the largest bursting likelihood score based on the ranking of the clusters. The set of PBCs may be referred to as $R=(r_1, r_2, \ldots, r_i)$. At decision block 520, it is determined whether to access another point in the set of points. If the last point in the set of points has not been accessed, then process 500 returns to block 502 to access another point. If the currently accessed point is the last point in the set of point, then process 500 may terminate.

Figure 5B:
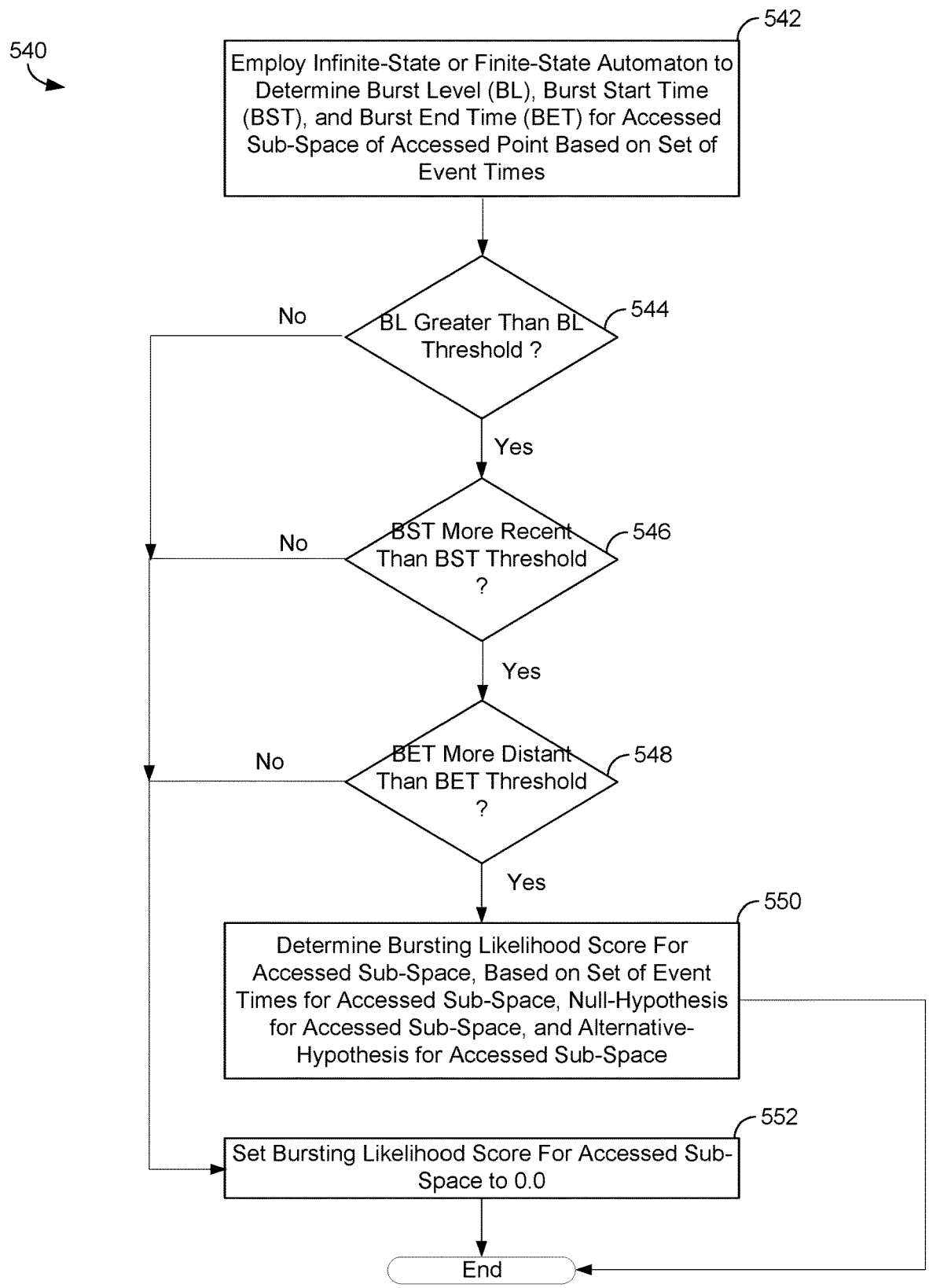
FIG. 5B provides a flow diagram that illustrates a process for the enhanced determination of a bursting likelihood score for potentially bursting clusters of related events within time-series data that is consistent with some of the embodiments.

Turning now to FIG. 5B, where a flow diagram is provided that illustrates a process 540 for the enhanced determination of a bursting likelihood score for potentially bursting clusters of related events within time-series data of the present disclosure. At least portions of process 540 may be enabled by, performed by, and/or carried out by devices and/or components included in operating environment 100 of FIG. 1 and/or enhanced system 200 of FIG. 2.

At least portions of process 540 may be carried out and/or implemented by various components and/or modules of bursting cluster detector 250 of FIG. 2. Process 540 begins at block 542, where bursting cluster analysis module 254 may employ an infinite-state or a finite-state automaton to determine a burst level (BL), a burst start time (BST), and a burst end time (BET) for the accessed sub-space for the accessed point. The BL, BST, and BET may be determined based on the set of event times for the accessed sub-space. The set of event times may be the set of event times that was generated at block 510 of FIG. 5A. In one example, the set of event times may be comprised of the timestamps associated with the points included in the accessed sub-space. The infinite- or finite-state automaton may be a burst detection algorithm, such as but not limited to a Kleinberg burst detection algorithm that determines a BL, a BST, and a BET for the accessed sub-space.

Decision blocks 544, 546, and 548 comprise a series of AND'ed gates to proceed to block 550, where hypothesis testing is performed on a sub-space that passes each of the gates referenced in blocks 544-548. The gates include threshold tests. If the sub-space fails at least one of these threshold tests, process 552 flows to block 550, where a bursting likelihood score for the sub-space is assigned a bursting likelihood score of 0.0 At decision block 544, it is determined if the BL is greater than a BL threshold. In some embodiments, the BL threshold is set to 0.0. If the sub-space passed the threshold test of block 544, then process 540 flows to decision block 546. At decision block 546, it is determined whether the BST is more recent than a BST threshold. In some non-limiting embodiments, the BST threshold may be set to a week in the past, as compared to the current time. That is, at block 546, it may be determined that the bursting activity did not start more than a week ago. If the bursting activity is current enough, the process 540 flows to block 548. At decision block 548, it is determined if the BET is more distant than a BET threshold. In some embodiments, the BET threshold is the current time. For example, if the sub-space is still bursting, then the sub-space passes the threshold test of block 548.

When the sub-space passes each of the threshold tests, process 540 flows to block 550. At block 550, a bursting likelihood score is determined for the accessed sub-space. The bursting likelihood score may be determined based on hypothesis testing. In the hypothesis testing, the null hypothesis is that the accessed sub-space is not currently "bursting," meaning that the temporal frequency of events within the sub-space is consistent with a background or baseline frequency of events. The alternative hypothesis is that the sub-space is currently "bursting," meaning that the temporal frequency of events within the cluster is currently enhanced, as compared to the background or baseline frequency. Sub-spaces with a bursting likelihood score above a bursting threshold are considered to be a potentially emergent (or bursting) cluster associated with an anomalous issue within the time-series data.

The bursting cluster analysis module 254 may then perform the hypothesis testing. In at least one embodiment, hypothesis testing may be performed on a sub-space if and only if the determined BL is greater than 0.0, the BST is at most a week old, as compared to the current time (to eliminate old bursts from the analysis), and BET is not in the past, i.e., the cluster is currently bursting. See decision blocks 544, 546, and 548. If the sub-space passes these (and/or other threshold tests for being a potentially bursting cluster), then the hypothesis testing may be performed at block 550. Bursting cluster analysis module 254 may determine the bursting likelihood score ($lr_{j,i}$) for the cluster $h_{j,i}$ based on the hypothesis testing via the following expressing:

$$lr_{j,i}(h_{j,i}) = \frac{Pr(\text{Data} | H_1(h_{j,i}))}{Pr(\text{Data} | H_0(h_{j,i}))},$$

where data represents the time-series data, $Pr(\text{Data}|H_0(h_{j,i}))$ is probability that the null hypothesis (i.e., the event activity level within the sub-space is consistent with the background levels) is true, and $Pr(\text{Data}|H_1(h_{j,i}))$ is probability that the alternative hypothesis (i.e., the event activity level within the sub-space is enhanced, as compared to the background levels). At block 552, lr is set equal to 0.0 if the sub-space does not pass one or more of the threshold tests of decision blocks 544-548.

Figure 6:
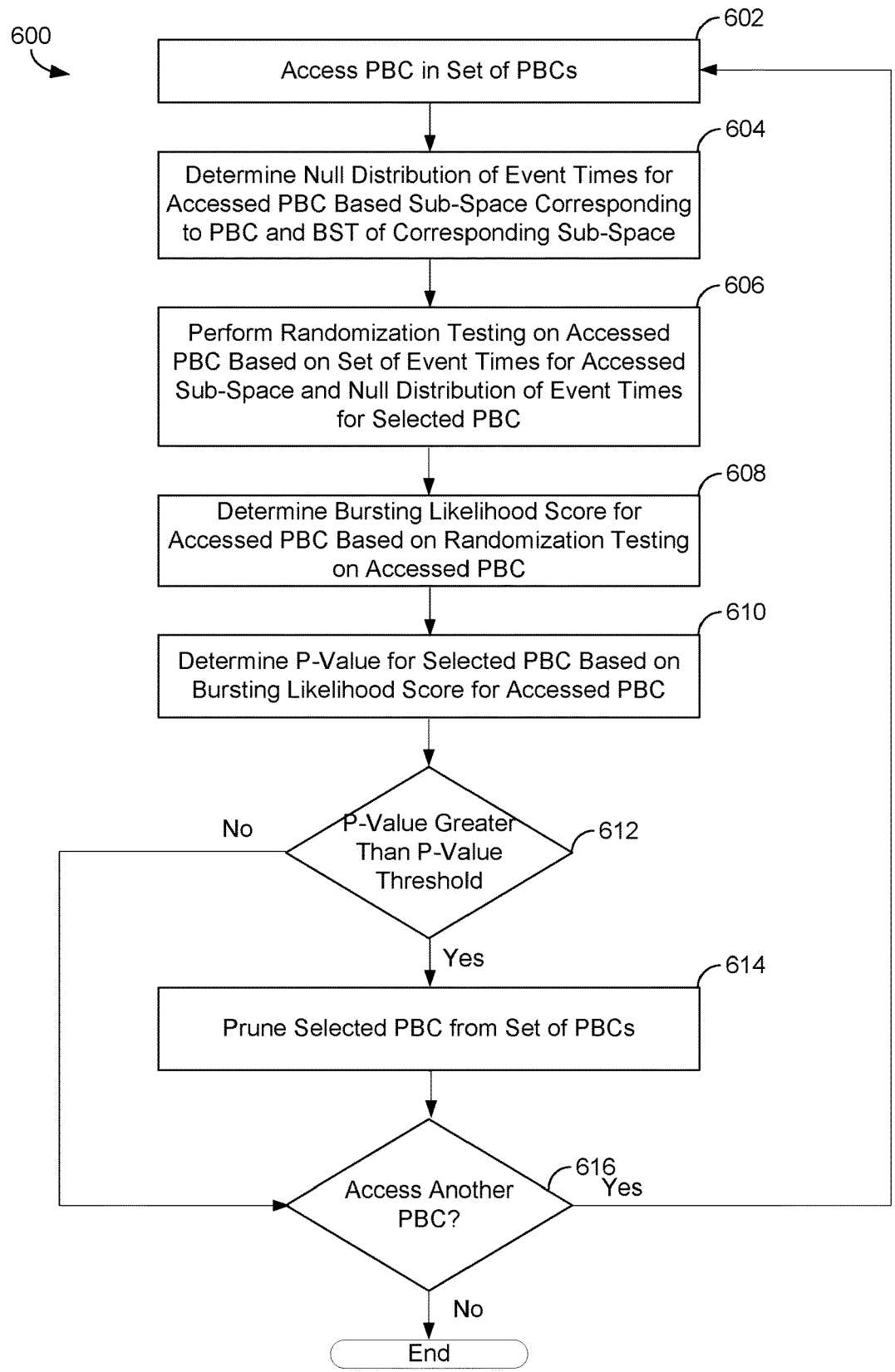
FIG. 6 provides a flow diagram that illustrates a process for the enhanced filtering of potentially bursting clusters of related events within time-series data that is consistent with some of the embodiments.

Turning now to FIG. 6, where a flow diagram is provided that illustrates a process 600 for the enhanced filtering of potentially bursting clusters of related events within time-series data of the present disclosure. At least portions of process 600 may be enabled by, performed by, and/or carried out by devices and/or components included in operating environment 100 of FIG. 1 and/or enhanced system 200 of FIG. 2.

At least portions of process 600 may be carried out and/or implemented by various components and/or modules of bursting cluster detector 250 of FIG. 2. In process 600, noisy clusters are filtered and/or pruned from the set of PBCs, based on their bursting likelihood. More particularly, bursting cluster filter 256 may filter the set of PBCs by performing randomization testing of each PBC ($r_i$) included in R. For each $r_i$ included in R, bursting cluster filter 256 may perform the following process N times, where N is a positive integer that is an adjustable parameter of the various embodiments. For each point ($p_i$) included in PBC r, an associated timestamp ($t_i$) is drawn, from a null distribution, i.e., $t_i \sim P_0(r)$, where $P_0(r)$ is a null distribution of event times, for the PBC, based on the time series data. For example, bursting cluster filter 256 may determine $P_0(r)$ based on an average time between event occurrences before the BST of r, e.g., a historical or baseline frequency of events. A "null cluster" (or non-bursting sub-space) r' for PBC r is generated, where the timestamps associated with the points in r' are determined from the samplings of the null distribution. The bursting likelihood score lr(r') for the null cluster is determined as discussed above.

A p-value for the PBC is determined as $$\frac{N^*}{N},$$

where N* is the number of times that lr(r')>lr(r). If the p-value is less than a confidence threshold ($\alpha$), for example 0.5, then it is unlikely that a burst would occur within this sub-space of the hyperspace by chance. That is, if the p-value for the PBC is greater than a p-value and/or confidence threshold, then the PBC may be bursting due to noise in the time-series data and the noisy PBC is pruned and/or removed from the set of PBCs.

Process 600 begins at block 602, where a PBC from the set of PBCs is accessed. Blocks 602-616 refer to a loop through each PBC in the set of PBCs. As such, for the first time at block 602, the first PBC in the set of PBCs may be accessed. Each time through the loop, the next PBC in the set may be accessed. The loop may be continued until all the PBCs in the set of PBCs have been processed via blocks 602-616. At block 604, a null distribution of event times is generated for the accessed PBC, based on the sub-space corresponding to the sub-space and the BST of the sub-space.

At block 606, randomization testing is performed on the accessed PBC as described above. At block 608, the bursting likelihood score for the accessed PBC is determined as described above. At block 610, a p-value for the PBC is determined based on the bursting likelihood score. At decision block 612, if the p-value is greater than a p-value threshold, then process 600 flows to block 614 to prune the PBC from the set of PBCs. Otherwise, the PBC is kept in the set, and process 600 returns to block 602 to access another PBC. At decision block 616, it is determined whether to access another PBC. If another PBC is to be accessed, process 600 returns to block 602 to continue the loop through the set of PBCs. Otherwise, process 600 may terminate.

Figure 7:
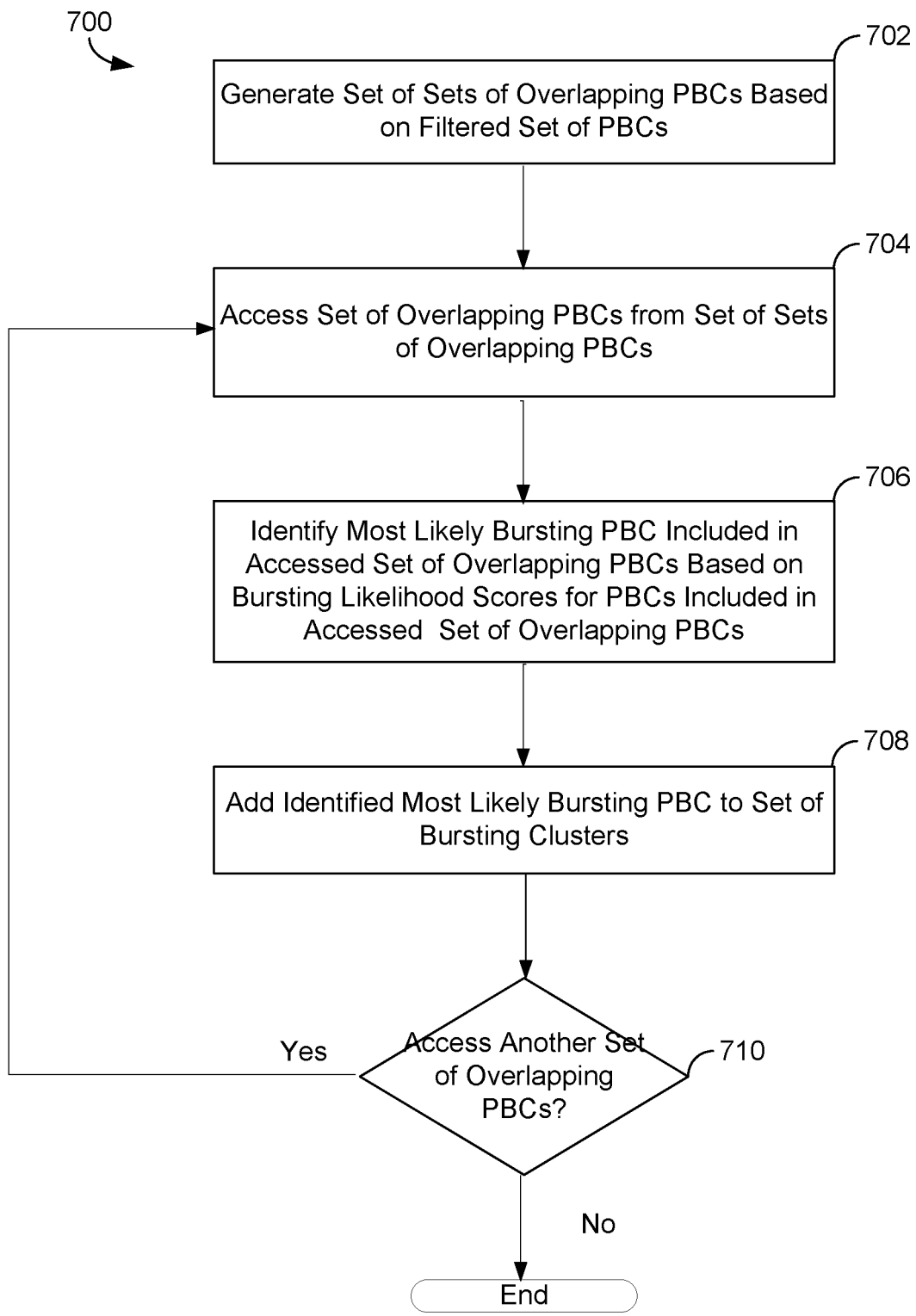
FIG. 7 provides a flow diagram that illustrates a process for generating a set of bursting clusters of related events within time-series data that is consistent with some of the embodiments.

Turning now to FIG. 7, where a flow diagram is provided that illustrates a process 700 for generating a set of bursting clusters of related events within time-series data of the present disclosure. At least portions of process 700 may be enabled by, performed by, and/or carried out by devices and/or components included in operating environment 100 of FIG. 1 and/or enhanced system 200 of FIG. 2.

At least portions of process 700 may be carried out and/or implemented by various components and/or modules of bursting cluster detector 250 of FIG. 2. In process 700, bursting cluster aggregator 258 may aggregate PBCs within the set of PBCs (filtered in process 600) by finding spatially overlapping PBCs within R. Such overlapping PBCs are likely to be a result of the same emerging anomalous issue within the time-series data. Bursting cluster aggregator 258 may aggregate PBCs as follows. A set of sets of overlapping PBCs may be generated from the filtered set of PBCs. The set of set of overlapping PBCs is referred to as O=(O$_1$, O$_2$, . . . , O$_s$), where O$_i$ is the i-th set of overlapping PBCs. 0 may be referred to as an aggregated set of PBCs. Process 700 may loop through the filtered set of PBCs, and for a particular r in the set of PBCs, if r is not already included in an element of O (i.e., r∉O$_i$, for any O$_i$ in O), then a new element is added to O that includes r. As looping through R is continued, any other PBC that overlaps with r is included in the new element that that was added to O and corresponds to r. That is, for all r' that overlaps with r (r∩r'≠∅) and not already included in a connected PBC, then O$_{r'}$ is added to O. This is repeated until there are no more overlapping PBCs within the set of PBC.

Bursting cluster aggregator 258 may generate a set of bursting clusters by pruning any duplicated PBCs from the aggregated set of PBCs. In at least one embodiment, for each O$_i$ in O, the PBC with the highest bursting likelihood score (O$_i$) in is kept and each of the other PBCs included in O$_i$ are removed and/or pruned. That is, for each O$_i$, the corresponding lr(r)s are compared, and the PBC with the highest lr(r) is added to a set of bursting clusters. For example, the most likely bursting PBC included in each O$_i$ is identified and added to the set of bursting clusters.

Process 700 begins at block 702, where a set of sets of overlapping PBCs is generated based on the filtered set of PBCs. At block 704, a set of overlapping PBCs from the set of sets of overlapping PBCs is accessed. Blocks 704-710 refer to a loop through each set of overlapping PBCs in the set of sets of overlapping PBCs. As such, for the first time at block 704, the first set of overlapping PBCs in the set of sets of overlapping PBCs may be accessed. Each time through the loop, the next set of overlapping PBCs in the set of sets may be accessed. The loop may be continued until all the sets of overlapping PBCs in the set of sets of overlapping PBCs have been processed via blocks 704-710.

At block 706, the most likely bursting PBC included in the accessed set of overlapping PBCs is identified. The most likely bursting PBC may be identified based on the bursting likelihood scores for PBCs included in the accessed set of overlapping PBCs. At block 708, the identified mist likely bursting PBS is added to the set of bursting clusters. At decision block 710, it is determined whether to access another set of overlapping PBCs. If another set of overlapping PBCs is to be processed, process 700 returns to block 702. Otherwise, process 700 may terminate.

Figure 8:
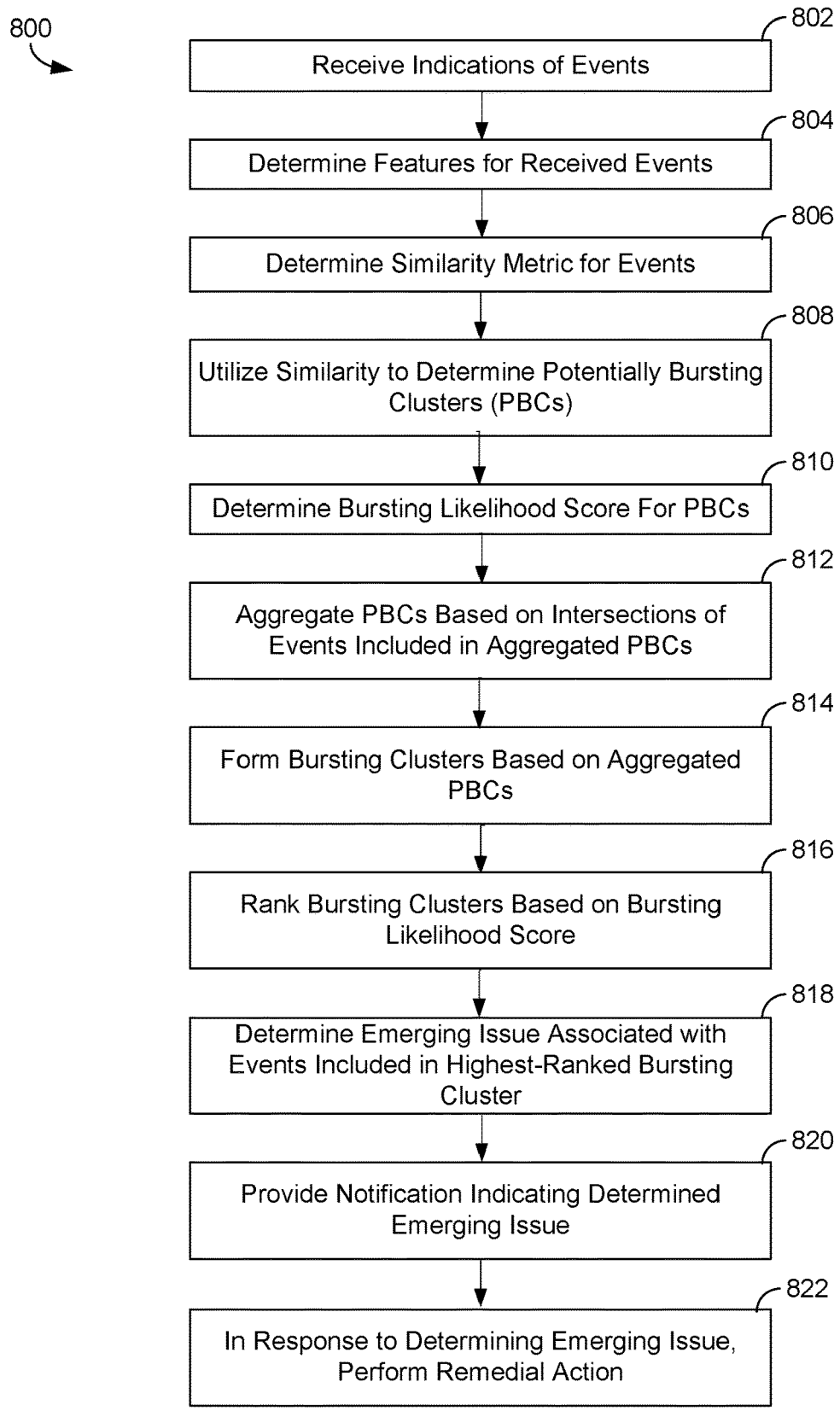
FIG. 8 provides a flow diagram that illustrates another process for the enhanced real-time monitoring, detection, and notification of emerging issues related to events, that is consistent with some of the embodiments.

Turning now to FIG. 8, in which FIG. 8 provides a flow diagram that illustrates another process for the enhanced real-time monitoring, detection, and notification of emerging issues related to events. Process 800 starts at block 802, where indications of events are received. The events may be computer security-related events. Each of the received events may include and/or be associated with an event time (e.g., each event may include a timestamp). In at least one embodiment, the events may be monitored at block 402. Various embodiments of monitoring events are discussed at least in conjunction with block 302 of FIG. 3. In some embodiments, receiving the indications of the events may include receiving the events. Various embodiments for receiving events are discussed at least in conjunction with block 402 of FIG. 4.

At block 804, features may be determined for each of the events that an indication for was received. That is, the events may be featurized. Accordingly, at block 804, and in response to receiving the indications of the events, a set of points within a hyperspace may be generated. Various embodiments for generating a set of points based on monitored and/or received events are discussed in conjunction with at least block 404 of FIG. 4.

At block 806, a similarity metric for the events may be determined. For example, the similarity metric may characterize a similarity of the events. The similarity metric may include a distance between the events, when the events are embedded in a hyperspace via a vector embedding. Determining a similarity metric for the events may include determining the k-nearest neighbors for each event, as discussed in conjunction with at least block 406 of FIG. 4.

At block 808, the similarity metric may be employed to determine a plurality of and/or a set of potentially busting clusters (PBCs). Various embodiments for determining a plurality of and/or a set of PBCs are discussed at least in conjunction with block 408 of FIG. 4. However, briefly here, each PBC may include a portions of the events. At block 810, a bursting likelihood score may be determined for each PBC. Various embodiments for determining a bursting likelihood score for a PBC are discussed at least in conjunction with FIGS. 5A-5B. However, briefly here, the bursting likelihood score for a particular PBC may represent a temporal frequency associated with the event times associated with the events included in the particular PBC.

At block 812, the PBCs are aggregated based on intersections of the events included in the aggregated PBCs. Various embodiments for aggregating PBCs are discussed in conjunction with block 412 of FIG. 4 and process 700 of FIG. 7. In some embodiments, at block 812, the PBCs may be filtered by pruning low-confidence PBCs, as discussed in conjunction with at least block 410 of FIG. 4 and process 600 of FIG. 6. At block 814, at least one bursting cluster may be formed based on the aggregated PBCs. That is a set of bursting clusters may be generated, as discussed in conjunction with at least block 414 of FIG. 4 and process 700 of FIG. 7. As discussed throughout, the bursting clusters may be assigned and/or have a bursting likelihood score based on the bursting likelihood scores of the aggregated PBCs.

At block 816, the bursting clusters may be ranked based on the associated bursting likelihood scores. Various embodiments for ranking bursting clusters are discussed in conjunction with at least block 416 of FIG. 4. At block 818, an emerging issue associated with the events included in a highest-ranked bursting cluster may be determined. Various embodiments for detecting and/or identifying an issue are discussed in conjunction with at least block 304 of FIG. 3 and process 400 of FIG. 4. In embodiments where the events are computer security-related events, the determined emerging issue may be a computer security-related issue. At block 820, a notification that indicates the emerging issue may be provided. Various embodiments for providing a notification indicating an emerging issue are discussed in conjunction with at least block 306 of FIG. 3.

At block 822, in response to determining and/or identifying an emerging issue, a remedial action may be performed. The remedial action may be performed to correct, rectify, attend to, and/or otherwise address the detected, determined, and/or identified emerging issue. The remedial action may include isolating, quarantining, and/or terminating any and/or all activity associated with the identified issue. The isolated, quarantined, and/or terminated activity may include user activity, and/or other activity, functionality, and/or operations of the computing environment, platform, and/or system associated with the events. That is, in response to detecting the one or more emerging issues, an action (e.g., a remedial action) may be performed. The performance of the remedial action (e.g., a response) may be an automatic response, a manual response, or a combination thereof. The action and/or response may be based on and/or affect the events included in the emergent cluster associated with the emergent issue and/or activity. In one non-limiting embodiment, the action and/or response may include quarantining, isolating, or even terminating activating associated with the events included in the emergent cluster associated with the emergent issue. In some embodiments, the events within the emergent cluster, may be indicative of nefarious-user activity associated with the security of computing and/or communication networking applications. The access rights of the offending user may be withdrawn and/or the user's ability to access the functionalities of the application may be terminated in such embodiments. In some embodiments, the ability of one or more computing devices associated with the offending user may be terminated. For example, each computing device that the offending user has previously employed to access the system may quarantined and/or quarantined from the system. To isolate and/or limit any potential damage to computing resources, including user data, at least a portion of (e.g., functionalities, operations, and/or sub-systems) the computing environment, platform, and/or system may be terminated, temporarily disabled, and/or taken offline. Thus, any privacy concerns regarding user data may be managed, limited, and/or mitigated by performing the remedial action. At block 822, various computing machines of the environment, platform, and/or system may be shutdown, rebooted, updated, taken offline, and/or otherwise disabled in response to detecting the emergent issue. More generally, at block 822, the detection and/or identification of the emergent issue may trigger one or more remedial actions.

As noted throughout, some non-limiting embodiments are directed towards detecting emergent issues related to computer-security, such as but not limited to nefarious user activity, e.g., attempts at unauthorized access to computing environments, systems, and/or platforms. In such embodiments, computer security-related events may be monitored via process 800. In some embodiments, the events may be generated by and/or associated with environments, systems, and/or platforms that include one or more machines, such as robots, drones, a factory or manufacturing system, airplane or vehicle; or a mechanical device, especially one subject to wear or that requires maintenance, such as a wheel, engine, compressor, pump, generator; or similar systems. Many such systems, as well as the platforms and environments associated with these systems, will generate a stream of data regarding the system's operation. In such embodiments, the events may be generated by and/or be associated with such machines. For example, a large machine or system may include sensors or monitoring services that are configured to detect or report certain aspects of system activity. The events may include data from the sensors and/or monitoring systems. In such embodiments, at block 822, the remedial action may include initiating isolating, quarantining, and/or termination the operation and/or functionality of one more machines associated with the events corresponding to the emerging issue. In at least one embodiments, the remedial action may include triggering or otherwise initiating a maintenance and/or repair of the affected machines. In some embodiments, the events may be associated with one or more at least somewhat autonomous vehicles (e.g., autonomous cars and/or trucks, drones, spacecraft, planetary rovers, missiles/rockets, or the like). The remedial action of block 822 may include changing a direction, speed, velocity, and/or acceleration of the vehicle in one or more spatial dimensions.

Figure 9:
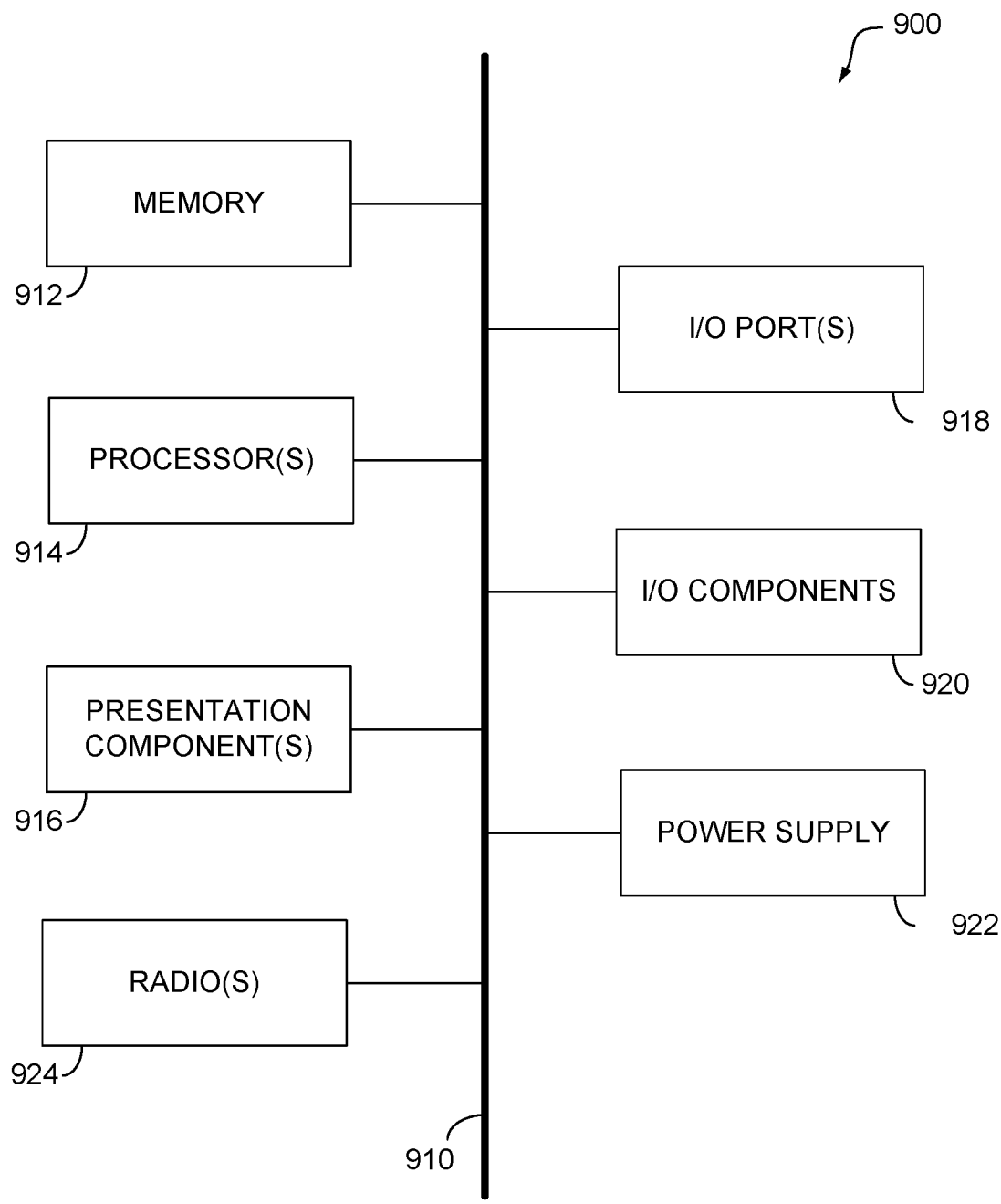
FIG. 9 is a block diagram of an exemplary computing environment suitable for use in implementing an embodiment of the present disclosure.

Having described various implementations, an exemplary computing environment suitable for implementing embodiments of the disclosure is now described. With reference to FIG. 9, an exemplary computing device is provided and referred to generally as computing device 900. The computing device 900 is but one example of a suitable computing environment and is not intended to suggest any limitation as to the scope of use or functionality of embodiments of the disclosure. Neither should the computing device 900 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

Additional Embodiments

Additional embodiments include a method for detecting emerging issues. A detected emerging issue may be an emerging security-related issue. The method may include: in response to receiving a set of events, generating a set of points in a hyperspace. The events may be security-related events. Each point included in the set of points corresponds to a security-related event included in the set of security-related events and is associated with a timestamp of the corresponding security-related event. The method may further include: determining a set of potential bursting clusters (PBCs) within the hyperspace based on a distance metric associated with each pair of points included in the set of points. Each PBC within the set of PBCs is a sub-space of the hyperspace that includes one or more points of the set of points and is characterized by a bursting likelihood score that is based on the timestamps associated with the one or more points included sub-space of the PBC. The method may further include: generating a set of bursting clusters by aggregating PBCs within the set of PBCs based on an intersection of the sub-spaces of the PBCs. The set of bursting clusters is ranked based on the bursting likelihood scores of the aggregated PBCs. The method may further include: providing a notification that indicates the emerging security-related issue. The emerging security-related issue is associated with a subset of the set of security-related events that correspond to a subset of the set of points that are included in a sub-space of a highest-ranked bursting cluster of the set of bursting clusters.

The method may further include: for a first point of the set of points, determining k-nearest neighboring points based on the distance metric. For the first point, a first set of sub-spaces may be determined based on the k-nearest neighboring points of the first point, wherein a first sub-space of the first set of subspaces includes a first subset of the k-nearest neighboring points. A set of event times may be determined. Each event time included in the set of event times is based on a timestamp associated with a point included in the first subset of the k-nearest neighboring points. A burst-detection algorithm may be employed to determine a bursting level for the set of event times. A first PBC may be added to the set of PBCs based on the bursting level for the set of event times.

The burst-detection algorithm may be employed to determine a bursting start time (BST) and a bursting end time (BET) for the set of event times. A first bursting likelihood score for the first PBC is determined based on the bursting level, the BST, and the BET for the set of event times. The bursting likelihood score for the first PBC may be further based on a null distribution of event times associated with the first sub-space. The bursting detection algorithm may be a Kleinberg bursting detection algorithm.

Randomization testing may be performed on the set of PBCs based on a null distribution of event times associated with each PBC included in the set of PBCs. A confidence value may be determined for each PBC included in the set of PBCs. The set of PBCs may be filtered based on the confidence value for each PBC and a confidence threshold.

A set of sets of overlapping PBCs may be generated based on the intersection of the subspaces of the PBCs. For each set of overlapping PBCs included in the set of sets of overlapping PBCs, a most-likely PBC may be identified based on the bursting likelihood scores of the PBCs included in the set of PBCs. The set of bursting clusters may be updated to include the most-likely PBC.

Generalized Computing Device

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. In some implementations, presentation component 220 of system 200 may be embodied as a presentation component 916. Other examples of presentation components may include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system for detection of an emerging security-related issue, the system comprising:
  a processor; and
  computer storage memory having computer-executable instructions stored thereon which, when executed by the processor, implement a method comprising:
  receiving indications of a plurality of security-related events, each of the plurality of security-related events having an associated event time;
  determining a plurality of features for each of the plurality of security-related events;
  determining a similarity metric characterizing a similarity of the plurality of features for the plurality of security-related events;
  utilizing the similarity metric to determine a plurality of potentially bursting clusters (PBCs), each of the plurality of PBCs including at least a portion of the plurality of security-related events and having a bursting likelihood score that represents a temporal frequency associated with event times of the portion of the plurality of security-related events included in the each of the plurality of PBCs;
  aggregating at least a portion of the plurality of PBCs to form aggregated PBCs, based on at least one intersection of portions of the plurality of security-related events included in the aggregated PBCs, to form at least one bursting cluster;
  ranking the at least one bursting cluster based on bursting likelihood score of the at least one bursting cluster;
  determining an emerging security-related issue associated with the portion of the plurality of security-related events included in a highest-ranked bursting cluster of the ranked at least one bursting cluster; and
  providing a notification that indicates the emerging security-related issue.

2. The system of claim 1, wherein the method further comprises:
  generating a set of points in a hyperspace, wherein each point included in the set of points corresponds to a security-related event included in the plurality of security-related events and is associated with the event time of the corresponding security-related event;
  determining the plurality of PBCs within the hyperspace based on a distance metric associated with each pair of points included in the set of points, wherein the distance metric is based on the similarity metric and each PBC of the plurality of PBCs is a sub-space of the hyperspace that includes a plurality of points of the set of points and is characterized by the bursting likelihood score that is based on the event times associated with the plurality of points included sub-space of the each of the plurality of PBCs; and
  forming the at least one bursting cluster based on an intersection of the sub-spaces of the plurality of PBCs.

3. The system of claim 2, where in the method further comprises:
  for a first point of the set of points, determining k-nearest neighboring points based on the distance metric; and
  for the first point, determining a first set of sub-spaces based on the k-nearest neighboring points of the first point, wherein a first sub-space of the first set of subspaces includes a first subset of the k-nearest neighboring points;

determining a set of event times, wherein each event time included in the set of event times is based on the event time associated with a point included in the first subset of the k-nearest neighboring points;

employing a burst-detection algorithm to determine a bursting level for the set of event times; and adding a first PBC to the plurality of PBCs based on the bursting level for the set of event times.

4. The system of claim 3, wherein the method further comprises:

employing the burst-detection algorithm to determine a bursting start time (BST) and a bursting end time (BET) for the set of event times; and determining a first bursting likelihood score for the first PBC based on the bursting level, the BST, and the BET for the set of event times.

5. The system of claim 3, wherein the bursting likelihood score for the first PBC is further based on a null distribution of event times associated with the first sub-space.

6. The system of claim 3, wherein bursting detection algorithm is a Kleinberg bursting detection algorithm.

7. The system of claim 2, wherein the method further comprises:

generating a set of sets of overlapping PBCs based on the intersection of the subspaces of the plurality of PBCs;

for each set of overlapping PBCs included in the set of sets of overlapping PBCs, identifying a most-likely PBC based on the bursting likelihood scores of the plurality of PBCs included in the plurality of PBCs; and updating the at least one bursting cluster to include the most-likely PBC.

8. The system of claim 1, wherein the method further comprises:

performing randomization testing on the plurality of PBCs based on a null distribution of event times associated with each PBC included in the plurality of PBCs;

determining a confidence value for each PBC included in the plurality of PBCs; and filtering the plurality of PBCs based on the confidence value for each PBC and a confidence threshold.

9. A method for detection of an emerging issue, the method comprising:

receiving indications of a plurality of events, each of the plurality of events having an associated event time;

determining a plurality of features for each of the plurality of events;

determining a similarity metric characterizing a similarity of the plurality of features for the plurality of events;

utilizing the similarity metric to determine a plurality of potentially bursting clusters (PBCs), each of the plurality of PBCs including at least a portion of the plurality of events and having a bursting likelihood score that represents a temporal frequency associated with event times of the portion of the plurality of events included in the each of the plurality of PBCs;

aggregating at least a portion of the plurality of PBCs, based on at least one intersection of portions of the plurality of events included in the aggregated PBCs, to form at least one bursting cluster;

ranking the at least one bursting cluster based on their bursting likelihood scores;

determining the emerging issue associated with the portion of the plurality of events included in a highest-ranked bursting cluster of the ranked at least one bursting cluster; and providing a notification that indicates the emerging issue.

10. The method of claim 9, further comprising:

generating a set of points in a hyperspace, wherein each point included in the set of points corresponds to an event included in the plurality of events and is associated with the event time of the corresponding event;

determining the plurality of PBCs within the hyperspace based on a distance metric associated with each pair of points included in the set of points, wherein the distance metric is based on the similarity metric and each PBC of the plurality of PBCs is a sub-space of the hyperspace that includes a plurality of points of the set of points and is characterized by the bursting likelihood score that is based on the event times associated with the plurality of points included sub-space of the each of the plurality of PBCs; and forming the at least one bursting cluster based on an intersection of the sub-spaces of the plurality of PBCs.

11. The method of claim 10, further comprising:

for a first point of the set of points, determining k-nearest neighboring points based on the distance metric; and for the first point, determining a first set of sub-spaces based on the k-nearest neighboring points of the first point, wherein a first sub-space of the first set of subspaces includes a first subset of the k-nearest neighboring points;

determining a set of event times, wherein each event time included in the set of event times is based on the event time associated with a point included in the first subset of the k-nearest neighboring points;

employing a burst-detection algorithm to determine a bursting level for the set of event times; and adding a first PBC to the plurality of PBCs based on the bursting level for the set of event times.

12. The method of claim 11, wherein the method further comprises:

employing the burst-detection algorithm to determine a bursting start time (BST) and a bursting end time (BET) for the set of event times; and determining a first bursting likelihood score for the first PBC based on the bursting level, the BST, and the BET for the set of event times.

13. The method of claim 11, wherein the bursting likelihood score for the first PBC is further based on a null distribution of event times associated with the first sub-space.

14. The method of claim 11, wherein bursting detection algorithm is a Kleinberg bursting detection algorithm.

15. The method of claim 10, wherein the method further comprises:

generating a set of sets of overlapping PBCs based on the intersection of the subspaces of the PBCs;

for each set of overlapping PBCs included in the set of sets of overlapping PBCs, identifying a most-likely PBC based on the bursting likelihood scores of the plurality of PBCs included in the plurality of PBCs; and updating the at least one bursting cluster to include the most-likely PBC.

16. The method of claim 9, wherein the method further comprises:

performing randomization testing on the plurality of PBCs based on a null distribution of event times associated with each PBC included in the plurality of PBCs;

determining a confidence value for each PBC included in the plurality of PBCs; and filtering the plurality of PBCs based on the confidence value for each PBC and a confidence threshold.

17. A non-transitory computer-readable media having instructions stored thereon, wherein the instructions, when executed by a processor of a computing device, cause the computing device to perform actions including:
  receiving indications of a plurality of events, each of the plurality of events having an associated event time;
  determining a plurality of features for each of the plurality of events;
  determining a similarity metric characterizing a similarity of the plurality of features for the plurality of events;
  utilizing the similarity metric to determine a plurality of potentially bursting clusters (PBCs), each of the plurality of PBCs including at least a portion of the plurality of events and having a bursting likelihood score that represents a temporal frequency associated with event times of the portion of the plurality of events included in the each of the plurality of PBCs;
  aggregating at least a portion of the plurality of PBCs, based on at least one intersection of portions of the plurality of events included in aggregated PBCs, to form at least one bursting cluster;
  ranking the at least one bursting cluster based on bursting likelihood score of the at least one bursting cluster;
  determining an emerging issue associated with the portion of the plurality of events included in a highest-ranked bursting cluster of the ranked at least one bursting cluster; and
  providing a notification that indicates the emerging issue.

18. The computer-readable media of claim 17, the actions further comprising:
  generating a set of points in a hyperspace, wherein each point included in the set of points corresponds to an event included in the plurality of events and is associated with the event time of the corresponding event;
  determining the plurality of PBCs within the hyperspace based on a distance metric associated with each pair of points included in the set of points, wherein the distance metric is based on the similarity metric and each PBC of the plurality of PBCs is a sub-space of the hyperspace that includes a plurality of points of the set of points and is characterized by the bursting likelihood score that is based on the event times associated with the plurality of points included sub-space of the each of the plurality of PBCs; and
  forming the at least one bursting cluster based on an intersection of the sub-spaces of the plurality of PBCs.

19. The computer-readable media of claim 18, the actions further comprising:
  for a first point of the set of points, determining k-nearest neighboring points based on the distance metric; and
  for the first point, determining a first set of sub-spaces based on the k-nearest neighboring points of the first point, wherein a first sub-space of the first set of subspaces includes a first subset of the k-nearest neighboring points;
  determining a set of event times, wherein each event time included in the set of event times is based on the event time associated with a point included in the first subset of the k-nearest neighboring points;
  employing a burst-detection algorithm to determine a bursting level for the set of event times; and
  adding a first PBC to the plurality of PBCs based on the bursting level for the set of event times.

20. The computer-readable media of claim 19, wherein the actions further comprises:
  employing the burst-detection algorithm to determine a bursting start time (BST) and a bursting end time (BET) for the set of event times; and
  determining a first bursting likelihood score for the first PBC based on the bursting level, the BST, and the BET for the set of event times.

* * * * *